(12) United States Patent
Sato et al.

(10) Patent No.: US 9,151,933 B2
(45) Date of Patent: Oct. 6, 2015

(54) IMAGE-CAPTURING APPARATUS, CONTROL METHOD FOR IMAGE-CAPTURING APPARATUS, AND PROGRAM

(75) Inventors: Muneyuki Sato, Saitama (JP); Shuuji Okegawa, Chiba (JP); Keiji Osano, Tokyo (JP); Yoshihiko Nishimura, Tokyo (JP)

(73) Assignee: Sony Corporation, Tokyo (JP)

( * ) Notice: Subject to any disclaimer, the term of this patent is extended or adjusted under 35 U.S.C. 154(b) by 39 days.

(21) Appl. No.: 13/514,633

(22) PCT Filed: Oct. 1, 2010

(86) PCT No.: PCT/JP2010/067263
§ 371 (c)(1),
(2), (4) Date: Jun. 8, 2012

(87) PCT Pub. No.: WO2011/077805
PCT Pub. Date: Jun. 30, 2011

(65) Prior Publication Data
US 2012/0262621 A1 Oct. 18, 2012

(30) Foreign Application Priority Data
Dec. 25, 2009 (JP) ................................. 2009-296064

(51) Int. Cl.
*H04N 5/225* (2006.01)
*G02B 13/06* (2006.01)
(Continued)

(52) U.S. Cl.
CPC ................ *G02B 13/06* (2013.01); *G02B 15/10* (2013.01); *G03B 17/565* (2013.01); *G03B 37/02* (2013.01);
(Continued)

(58) Field of Classification Search
CPC .............. H04N 5/2259; H04N 5/2356; H04N 5/23209
USPC ................. 348/335, 345, 360, 361, 373, 375, 348/333.06
See application file for complete search history.

(56) References Cited

U.S. PATENT DOCUMENTS 4,566,763 A * 1/1986 Greguss ........................ 359/725
5,473,474 A * 12/1995 Powell ........................... 359/725
(Continued)

FOREIGN PATENT DOCUMENTS

CN 1421724 A 6/2003
CN 101151888 A 3/2008
(Continued)

OTHER PUBLICATIONS

International Preliminary Report on Patentability mailed Jul. 5, 2012, in connection with International Application No. PCT/JP2010/067263.
(Continued)

*Primary Examiner* — Sinh Tran
*Assistant Examiner* — Zhenzhen Wu
(74) *Attorney, Agent, or Firm* — Wolf, Greenfield & Sacks, P.C.

(57) ABSTRACT

Enabling an ordinary image-capturing apparatus to achieve all-around image-capturing without having a user to perform particularly difficult setting operation.
There is provided an image-capturing apparatus including, an image-capturing unit capable of detachably attaching an adapter having an all-around image-capturing optical system for capturing an image of a subject all around the image-capturing apparatus, and having an image-capturing optical system being for capturing a subject in one direction, and an image-capturing device for capturing a subject image incident from the image-capturing optical system,
an attachment detection unit for detecting whether or not the adapter is attached to the image-capturing unit, and
a control unit for controlling settings of the image-capturing apparatus in accordance with a characteristic of the all-around image-capturing optical system when the adapter is attached to the image-capturing unit.

14 Claims, 16 Drawing Sheets

(51) Int. Cl.
  *G02B 15/10*   (2006.01)
  *G03B 37/02*   (2006.01)
  *G03B 37/06*   (2006.01)
  *H04N 5/232*   (2006.01)
  *G03B 17/56*   (2006.01)
  *G02B 7/28*    (2006.01)

(52) U.S. Cl.
  CPC ............. *G03B 37/06* (2013.01); *H04N 5/2251* (2013.01); *H04N 5/232* (2013.01); *H04N 5/23238* (2013.01); *G02B 7/28* (2013.01); *H04N 2005/2255* (2013.01)

(56) References Cited

U.S. PATENT DOCUMENTS

| | | | |
|---|---|---|---|
| 6,449,103 | B1 | 9/2002 | Charles |
| 2003/0099045 | A1* | 5/2003 | Doi ............................... 359/725 |
| 2004/0109078 | A1* | 6/2004 | Artonne et al. ............... 348/335 |
| 2006/0045485 | A1* | 3/2006 | Kawamura ...................... 386/95 |
| 2007/0296837 | A1* | 12/2007 | Morita ..................... 348/240.99 |
| 2008/0180549 | A1* | 7/2008 | Lee et al. .................... 348/231.2 |
| 2008/0198255 | A1* | 8/2008 | Kirihara et al. ............... 348/341 |
| 2008/0225156 | A1 | 9/2008 | Kim |
| 2010/0045773 | A1* | 2/2010 | Ritchey .......................... 348/36 |

FOREIGN PATENT DOCUMENTS

| | | |
|---|---|---|
| CN | 101267500 A | 9/2008 |
| EP | 2 075 621 A1 | 7/2009 |
| JP | 2000-041169 A | 2/2000 |
| JP | 2001-257914 A | 9/2001 |
| JP | 2002-014405 A | 1/2002 |
| JP | 2003-167193 A | 6/2003 |
| JP | 2004-029083 A | 1/2004 |
| JP | 2004-254139 A | 9/2004 |
| JP | 2005-136669 A | 5/2005 |
| JP | 2005-175713 A | 6/2005 |
| JP | 2005-260737 A | 9/2005 |
| JP | 2009-192606 A | 8/2009 |
| WO | WO 2006/103595 A2 | 10/2006 |
| WO | 2008/004604 A1 | 1/2008 |

OTHER PUBLICATIONS

International Search Report and Written Opinion mailed Nov. 2, 2010, in connection with International Application No. PCT/JP2010/067263.

\* cited by examiner

FIG. 1
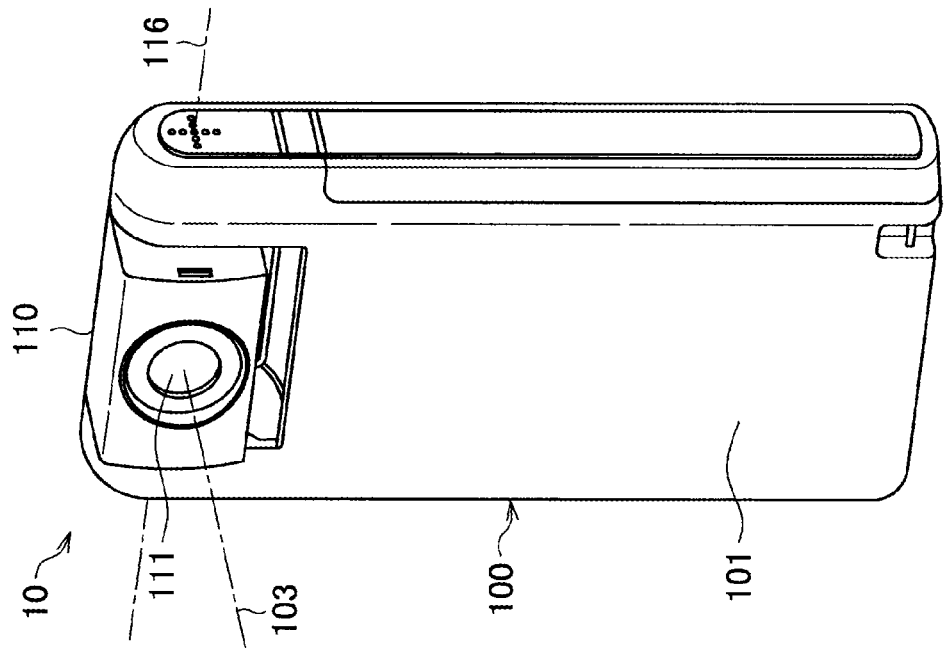
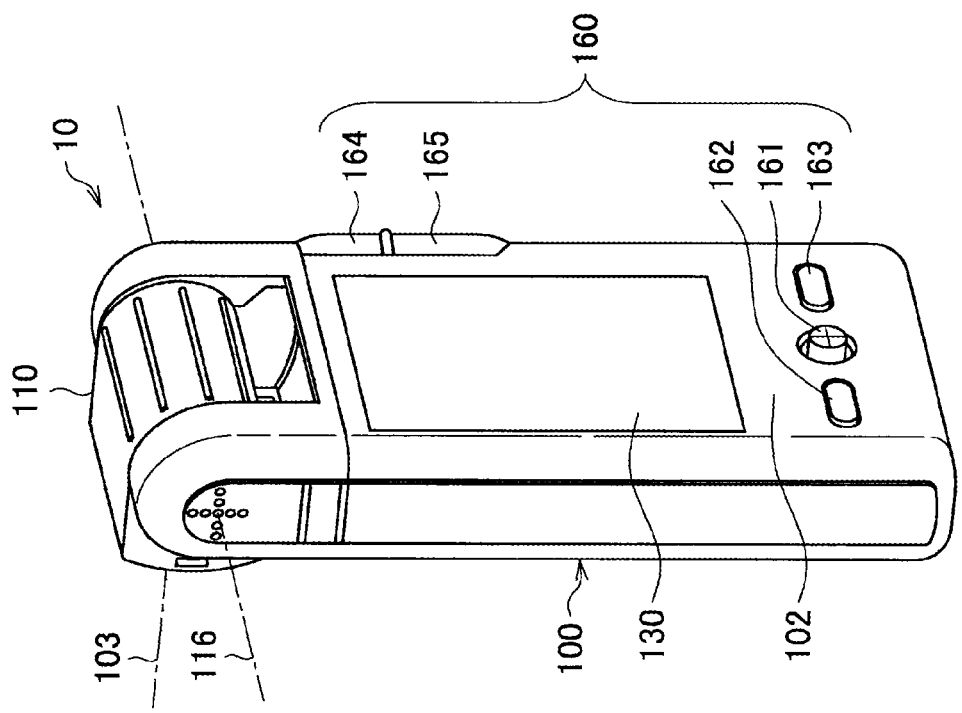

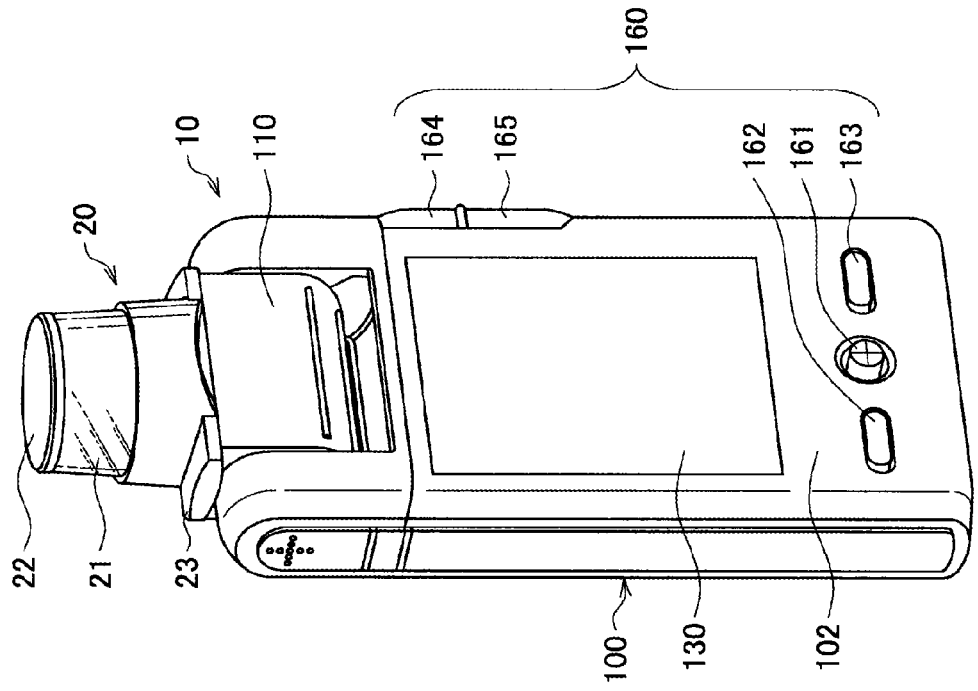
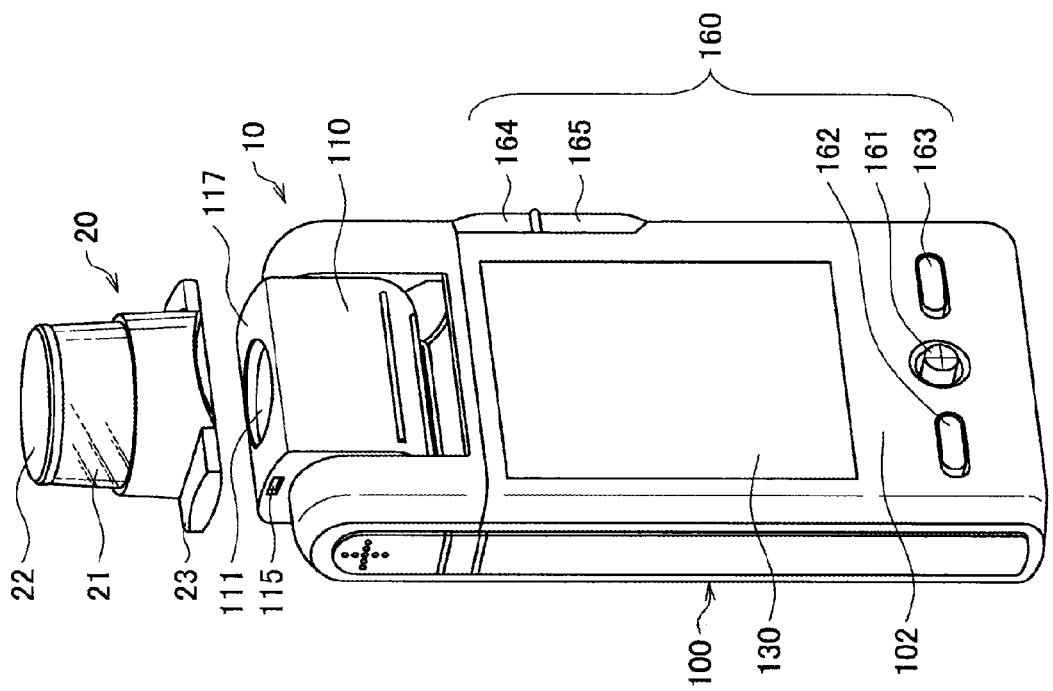
FIG. 4

FIG. 12
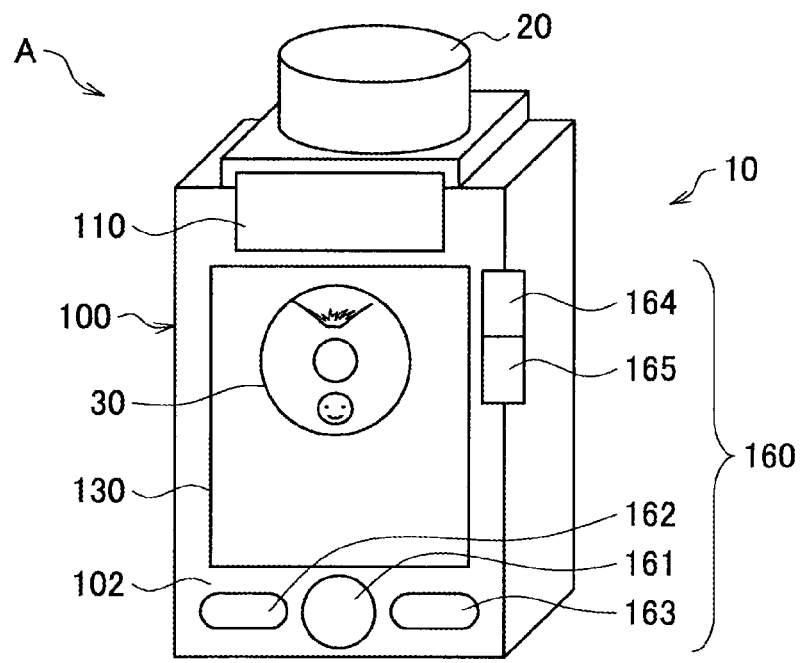
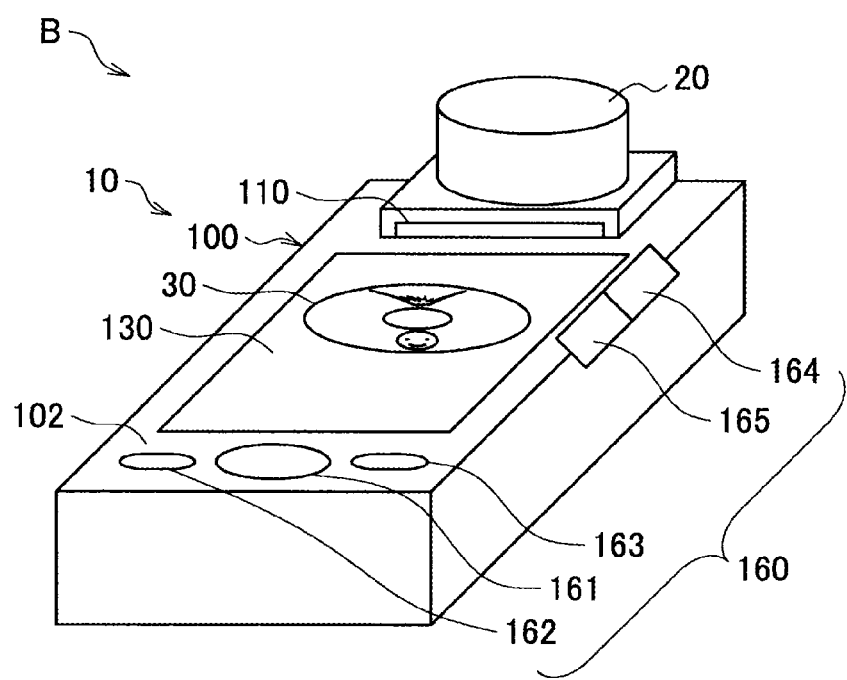

FIG. 13
LONG RANGE
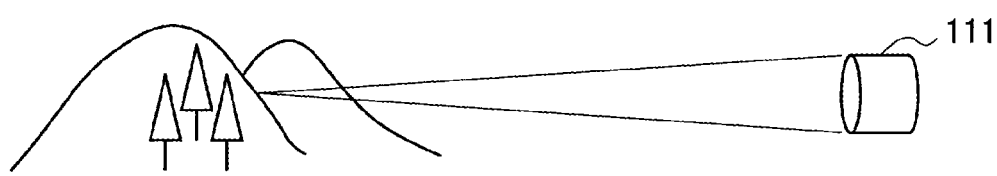
SHORT RANGE
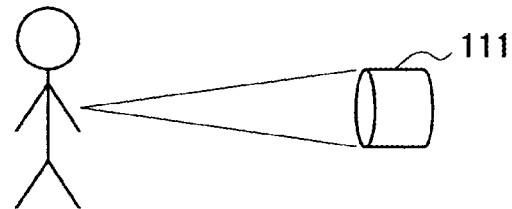
CLOSE PROXIMITY
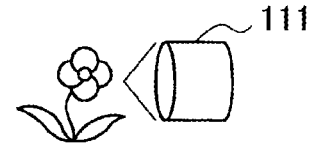

FIG. 14
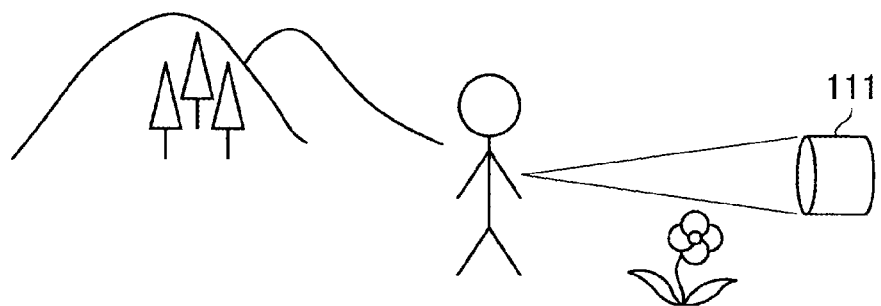
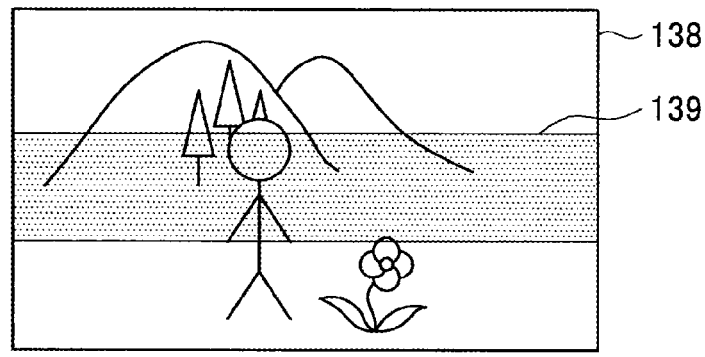

FIG. 15
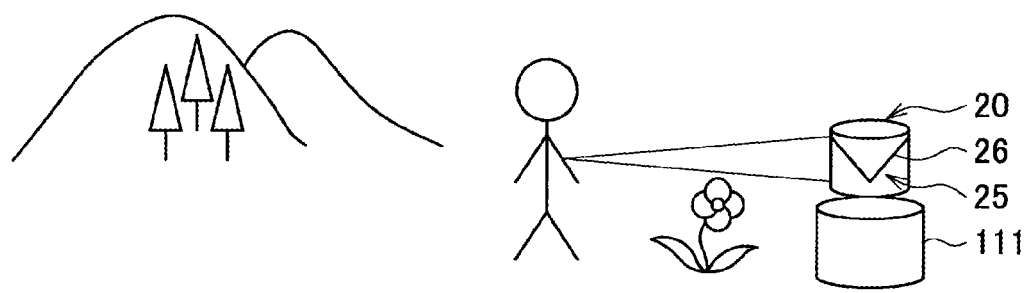
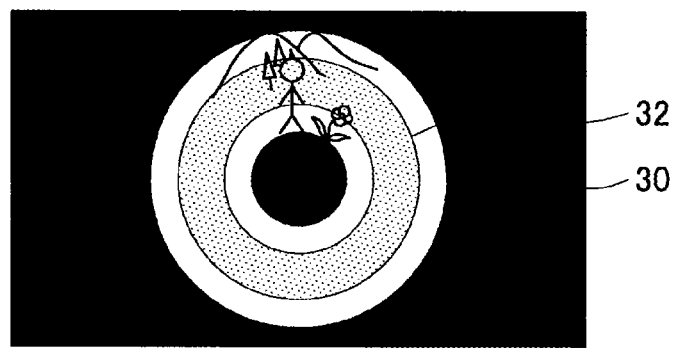

IMAGE-CAPTURING APPARATUS, CONTROL METHOD FOR IMAGE-CAPTURING APPARATUS, AND PROGRAM

RELATED APPLICATIONS

The present application is a national stage entry filed under 35 U.S.C. §371 of PCT Application No. PCT/JP2010/067263 filed Oct. 1, 2010, which claims priority to Japanese Patent Application JP-2009-296064 filed in the Japan Patent Office on Dec. 25, 2009.

TECHNICAL FIELD

The present invention relates to an image-capturing apparatus, a control method for the image-capturing apparatus, and a program.

BACKGROUND ART

An all-around image-capturing apparatus capable of capturing an image of subjects all around the image-capturing apparatus (360 degrees) using an all-around image-capturing optical system having a reflection surface having a rotationally symmetrical shape is known (see Patent Literature 1, 2). The all-around image-capturing apparatus collects lights of subject images all around the image-capturing apparatus incident upon the reflection surface of the all-around image-capturing optical system, and captures the subject images using an image-capturing device. As described above, the image captured using the all-around image-capturing optical system is a ring-shaped image showing the subjects all around the image-capturing apparatus (see Patent Literature 3). Such all-around image-capturing apparatus has an advantage in that the image all around the image-capturing apparatus can be captured with the single apparatus. Therefore, in the past, such all-around image-capturing apparatus is mainly used for professional cameras such as a security camera and an endoscope camera.

CITATION LIST

Patent Literature

| Patent Literature 1 | JP 59-192220A |
| Patent Literature 2 | JP 2000-131738A |
| Patent Literature 3 | JP 2003-304532A |

SUMMARY OF INVENTION

Technical Problem

However, the above conventional all-around image-capturing apparatus is used for the professional use such as a security camera only for the fixed purpose of capturing an image of subjects all around the security camera, i.e., the purpose of the above conventional all-around image-capturing apparatus is limited to the particular purpose. In other words, a single image-capturing apparatus cannot be switched and used both for all-around image capturing and ordinary image-capturing to capture a subject in one direction.

However, in recent years, ordinary image-capturing apparatuses for general consumers such as a digital still camera and a digital video camera are increasingly required to capture all-around images in order to diversify image-capturing methods. Accordingly, an ordinary image-capturing apparatus for capturing an image of a subject in one direction is desired to achieve all-around image capturing using a simple method.

Accordingly, the present invention is made in view of the above circumstances, and enables an ordinary image-capturing apparatus to achieve all-around image-capturing without having a user to perform particularly difficult setting operation.

Solution to Problem

According to an embodiment of the present invention, there is provided an image-capturing apparatus including, an image-capturing unit capable of detachably attaching an adapter having an all-around image-capturing optical system for capturing an image of a subject all around the image-capturing apparatus, and having an image-capturing optical system being for capturing a subject in one direction, and an image-capturing device for capturing a subject image incident from the image-capturing optical system, an attachment detection unit for detecting whether or not the adapter is attached to the image-capturing unit, and a control unit for controlling settings of the image-capturing apparatus in accordance with a characteristic of the all-around image-capturing optical system when the adapter is attached to the image-capturing unit.

The image-capturing apparatus further may include a display unit for displaying a captured image that is output from the image-capturing device.

At least one of the display unit and the image-capturing unit may be arranged so as to be able to rotate with respect to a main body unit of the image-capturing apparatus, the image-capturing apparatus further comprises a rotation detection unit for detecting a rotated state of the display unit or the image-capturing unit with respect to the main body unit, the control unit has a reverse display function for reversing and displaying the captured image on the display unit on the basis of the rotated state detected by the rotation detection unit, and when the adapter is attached to the image-capturing unit, the control unit disables the reverse display function.

When the adapter is not attached to the image-capturing unit, the control unit may control settings of an ordinary image-capturing operation for capturing the image of the subject in one direction in accordance with the characteristic of the image-capturing optical system, and when the adapter is attached to the image-capturing unit, the control unit may control settings of an all-around image capturing operation for capturing the image of the subject all around the image-capturing apparatus in accordance with the characteristic of the all-around image-capturing optical system.

When the adapter is attached to the image-capturing unit, the control unit may control an angle of view of the captured image obtained from the all-around image capturing operation, in accordance with the characteristic of the all-around image-capturing optical system.

When the adapter is attached to the image-capturing unit, the control unit may control the angle of view of the captured image by moving a zoom lens of the image-capturing optical system to a predetermined position according to the characteristic of the all-around image-capturing optical system.

When the adapter is attached to the image-capturing unit, the control unit may control the angle of view of the captured image by controlling an image size of the captured image output from the image-capturing device to change the image size to an image size according to the characteristic of the all-around image-capturing optical system.

The control unit may change a control method for a focal point position of the image-capturing optical system on the basis of whether or not the adapter is attached to the image-capturing unit.

Where the all-around image-capturing optical system has such an optical property that a focal point of a subject at any distance from the all-around image-capturing optical system is located inside of or in proximity to the all-around image-capturing optical system, the control unit may control the focal point position of the image-capturing optical system so as to focus on inside of or in proximity to the all-around image-capturing optical system when the adapter is attached to the image-capturing unit.

When the adapter is attached to the image-capturing unit, the control unit may limit an adjustment range of the focal point position of the image-capturing optical system with an autofocus function to a range in proximity to the image-capturing optical system.

When the adapter is attached to the image-capturing unit, the control unit may limit an evaluation target region of an exposure control of the captured image output from the image-capturing device to a region within a ring-shaped image obtained from the all-around image capturing operation.

The image-capturing apparatus may further include, an image-capturing auxiliary function for helping image-capturing operation with the image-capturing unit.

The control unit may change settings of the image-capturing auxiliary function on the basis of whether or not the adapter is attached to the image-capturing unit.

When the adapter is attached to the image-capturing unit, the control unit may disable user operation for changing settings of the image-capturing apparatus controlled according to the characteristic of the all-around image-capturing optical system.

According to an embodiment of the present invention, there is provided a control method for an image-capturing apparatus including a image-capturing unit capable of detachably attaching an adapter having an all-around image-capturing optical system for capturing an image of a subject all around the image-capturing apparatus, the image-capturing unit including an image-capturing optical system being for capturing a subject in one direction, and an image-capturing device for capturing a subject image incident from the image-capturing optical system, the control method comprising the steps of, detecting whether or not the adapter is attached to the image-capturing unit, and controlling settings of the image-capturing apparatus in accordance with a characteristic of the all-around image-capturing optical system when the adapter is attached to the image-capturing unit.

According to an embodiment of the present invention, there is provided a program for an image-capturing apparatus including a image-capturing unit capable of detachably attaching an adapter having an all-around image-capturing optical system for capturing an image of a subject all around the image-capturing apparatus, the image-capturing unit including an image-capturing optical system being for capturing a subject in one direction, and an image-capturing device for capturing a subject image incident from the image-capturing optical system, the program causing the image-capturing apparatus to execute the steps of, detecting whether or not the adapter is attached to the image-capturing unit, and controlling settings of the image-capturing apparatus in accordance with a characteristic of the all-around image-capturing optical system when the adapter is attached to the image-capturing unit.

According to the above configuration, detection is made as to whether an adapter is attached to an image-capturing unit detachably attached to an adapter having an all-around image-capturing optical system, and when the adapter is attached to the image-capturing unit, a setting of an image-capturing apparatus is controlled according to a characteristic of the all-around image-capturing optical system. Therefore, when the adapter is attached to the image-capturing unit, the setting of the image-capturing apparatus is automatically controlled to a setting suitable for the characteristic of the all-around image-capturing optical system.

Advantageous Effects of Invention

As explained above, according to the present invention, an ordinary image-capturing apparatus can achieve all-around image-capturing process without having a user to perform particularly difficult setting operation.

BRIEF DESCRIPTION OF DRAWINGS

FIG. 1 is a perspective view illustrating an external configuration of an image-capturing apparatus according to the first embodiment of the present invention.

FIG. 4 is a perspective view illustrating an external configuration of an adapter and the image-capturing apparatus according to the embodiment.

FIG. 12 is a perspective view illustrating a rotated state of an image-capturing unit of the image-capturing apparatus according to the embodiment.

FIG. 13 is an explanatory diagram illustrating focus control during ordinary image-capturing according to the embodiment.

FIG. 14 is an explanatory diagram illustrating focus control during ordinary image-capturing according to the embodiment.

FIG. 15 is an explanatory diagram illustrating focus control during all-around image capturing according to the embodiment.

DESCRIPTION OF EMBODIMENTS

Figure 2:
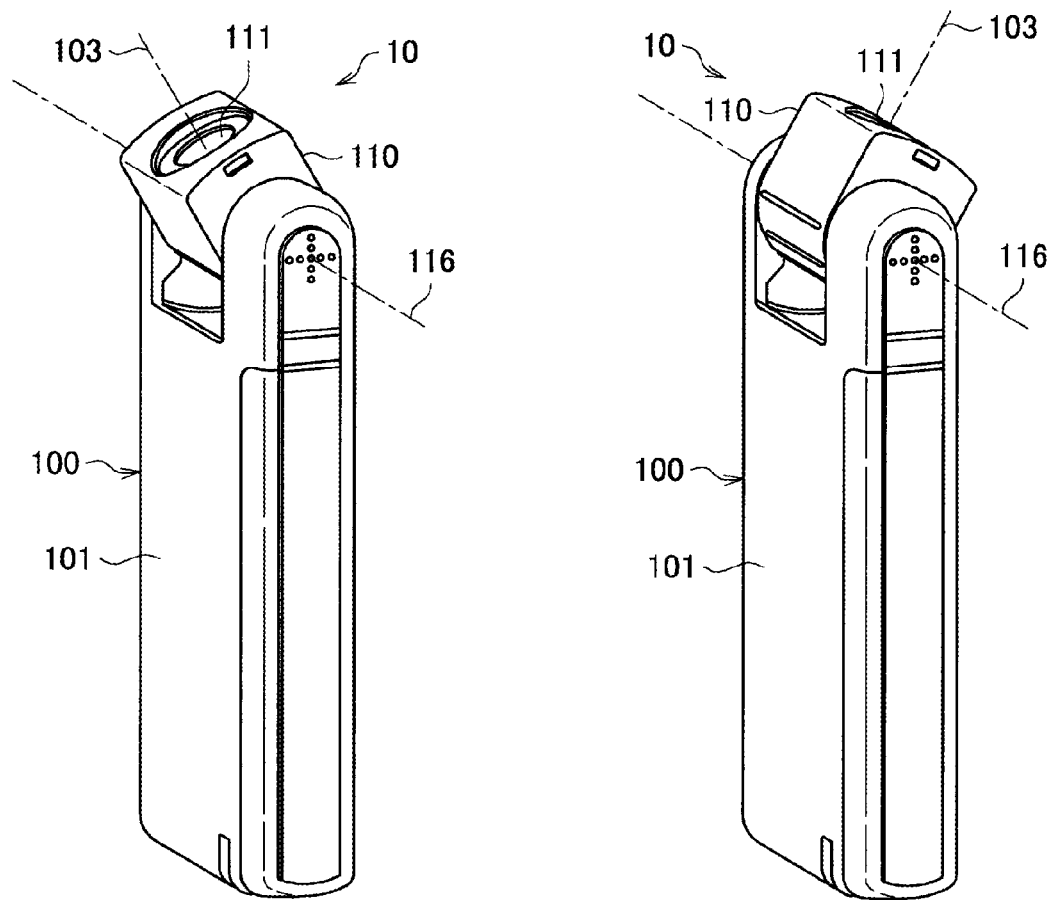
FIG. 2 is a perspective view illustrating an external configuration of the image-capturing apparatus according to the embodiment.

Hereinafter, preferred embodiments of the present invention will be described in detail with reference to the appended drawings. Note that, in this specification and the drawings, elements that have substantially the same function and structure are denoted with the same reference signs, and repeated explanation is omitted.

The following explanation will be made in an order described below.
1. External configuration of image-capturing apparatus
2. Configuration of all-around image-capturing optical system
3. Configuration of image-capturing apparatus
4. Configurations of rotation detection unit and attachment detection unit
5. Control method of image-capturing apparatus
6. Optimization of setting of display operation
7. Optimization of setting of image-capturing operation
   7.1. Optimization of angle of view
   7.2. Optimization of focus control
   7.3. Optimization of exposure control
   7.4. Disabling image-capturing auxiliary function
8. Optimization of setting of operation control
9. Another embodiment of image-capturing apparatus
10. Conclusion

[1. External Configuration of Image-Capturing Apparatus]

First, an external configuration of an image-capturing apparatus 10 according to the first embodiment of the present invention will be explained in detail with reference to FIGS. 1 to 5. FIGS. 1 to 5 are perspective views and a front view illustrating an external configuration of an image-capturing apparatus 10 according to the present embodiment. For example, the image-capturing apparatus of the present invention is realized with a digital camera such as the image-capturing apparatus 10 as shown in FIG. 1. However, the image-capturing apparatus of the present invention is not limited thereto. The present invention can be applied to any electronic apparatus having image-capturing function.

Figure 3:
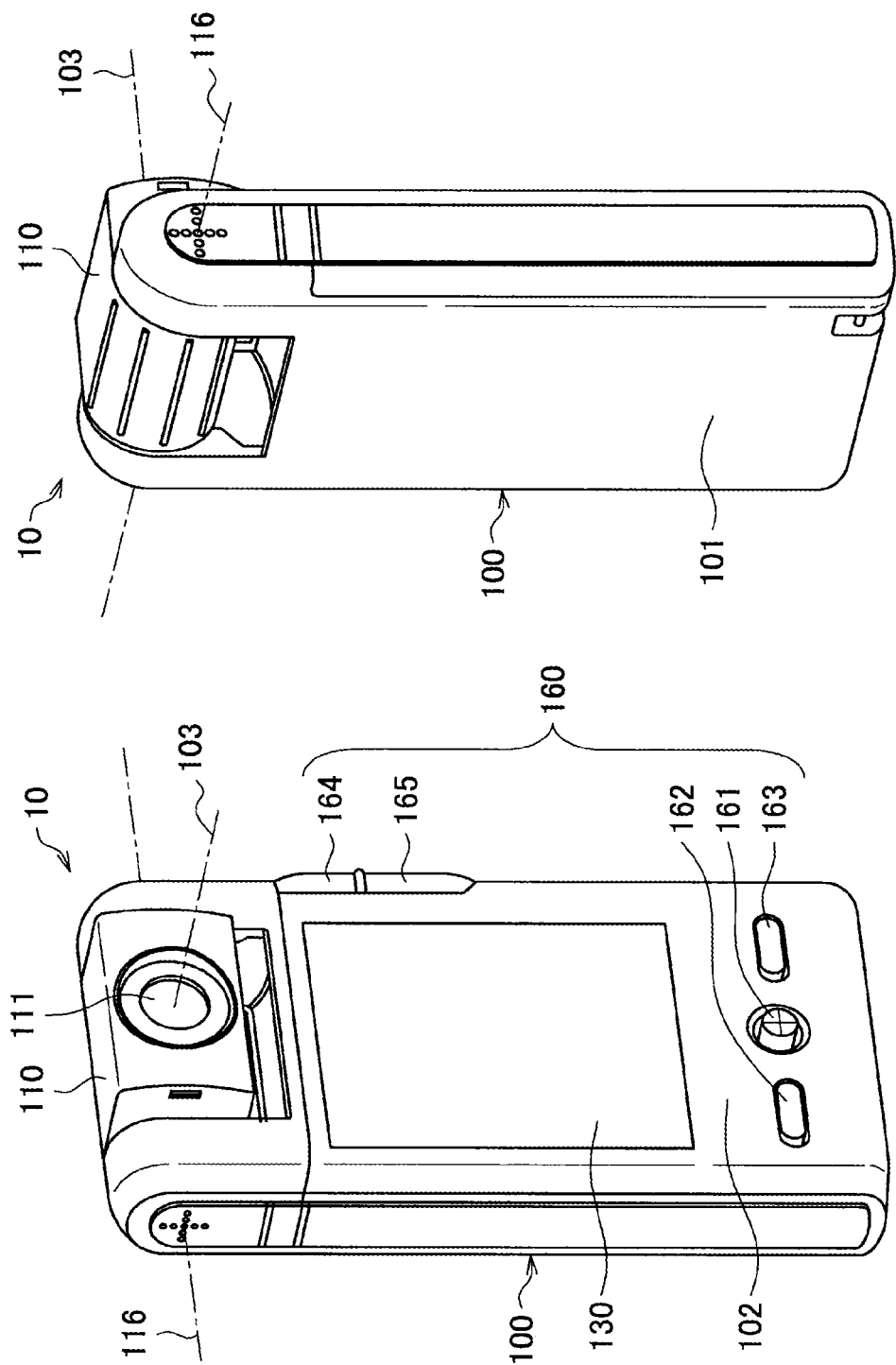
FIG. 3 is a perspective view illustrating an external configuration of an image-capturing apparatus according to the embodiment.

As shown in FIGS. 1 to 3, the image-capturing apparatus 10 according to the present embodiment is constituted by, for example, a digital camera (for example, a digital still camera, and a digital video camera) capable of taking still pictures and/or motion pictures. This image-capturing apparatus 10 captures an image of a subject, and records a still picture or a motion picture obtained from the image-capturing as digital image data to a recording medium. The image-capturing apparatus 10 is configured as a small and vertically long apparatus so that it is convenient for a user to carry and take pictures.

The image-capturing apparatus 10 according to the present embodiment includes a main body unit 100 occupying most of the apparatus and an image-capturing unit 110 rotatably arranged at an upper end of the main body unit 100. The main body unit 100 includes a control unit, a recording unit, a power source unit, and the like of the image-capturing apparatus 10. A display unit 130 for displaying a captured image and an operation unit 160 with which a user manipulates the image-capturing apparatus 10 are provided at a rear surface 102 of the main body unit 100. The operation unit 160 includes, for example, an operation key 161 for specifying up, down, right, and left directions and performing deciding operation, a preview button 162, a menu button 163, a release button 164 for taking and recording a still picture (photograph), a record button 165 for starting and ending image-capturing and recording of a motion picture, a zoom switch 166 for adjusting a zoom position between a telescopic end and a wide end, and the like.

The image-capturing unit 110 has a function of capturing an image of a subject. An image-capturing optical system 111 made of optical components such as a lens and an iris, an image-capturing device 112 (see FIG. 7), and the like are provided in a housing of the image-capturing unit 110. This image-capturing unit 110 is rotatably arranged on the main body unit 100 by means of a rotation mechanism, not shown. A rotation axis 116 of the image-capturing unit 110 is parallel to a display screen of the display unit 130, and is perpendicular to a longitudinal direction of the main body unit 100. When the image-capturing unit 110 is rotated about the rotation axis 116, the image-capturing unit 110 can be oriented in a direction of a front surface 101 and a direction of a rear surface 102 of the image-capturing apparatus 10. The rotated state of the image-capturing unit 110 is denoted as a rotation angle θ. The rotation angle θ is an angle formed by an optical axis 103 of the image-capturing optical system 111 of the image-capturing unit 110 and a direction perpendicular to the display screen of the display unit 130 (thickness direction of the main body unit 100). It should be noted that the front surface 101 of the image-capturing apparatus 10 according to the present embodiment is a surface opposite to the installation surface of the display unit 130, and the rear surface 102 of the image-capturing apparatus 10 is the installation surface of the display unit 130. In addition, the rotation direction of the image-capturing unit 110 is not limited to the illustrated example, and the design thereof can be changed as desired. The number of rotation axes is not limited to one as shown in the figures. Any number of multiple rotation axes such as two and three axes may be provided.

FIG. 1 shows a state where the rotation angle θ of the image-capturing unit 110 is 0 degree. When the image-capturing unit 110 is rotated as shown in FIG. 1 to orient the optical axis 103 of the image-capturing optical system 111 of the image-capturing unit 110 in a direction of the front surface 101 of the image-capturing apparatus 10 (hereinafter referred to as a front surface direction), the image-capturing apparatus 10 can capture an image of a subject existing in the front surface direction of the image-capturing apparatus 10 with the front surface direction being the image-capturing direction. At this occasion, a user can adjust, e.g., the angle of view while seeing a captured image (through image) displayed on the display unit 130 provided on the rear surface 102 of the main body unit 100, and can take a picture.

FIG. 2 shows a state where 0 degree<θ<180 degrees holds. As shown in FIG. 2, by rotating the image-capturing unit 110 with respect to the main body unit 100, the image-capturing unit 110 can change the image-capturing direction to any direction (front surface direction, upward direction, rear surface direction, and the like) without changing the direction of the main body unit 100.

FIG. 3 shows a state where θ is 180 degrees. As shown in FIG. 3, when the optical axis 103 of the image-capturing optical system 111 of the image-capturing unit 110 is oriented to the direction of the rear surface 102 of the image-capturing apparatus 10 (direction facing the user, hereinafter referred to as a rear surface direction), the image-capturing direction can be set in the rear surface direction, and the user can take a picture of himself/herself (self-image-capturing function). During this self-image-capturing process, the user can adjust, e.g., the angle of view while seeing, e.g., the face of the user displayed on the display unit 130 provided on the rear surface 102 of the main body unit 100, and can take a picture at a desired time.

As described above, the image-capturing apparatus 10 according to the present embodiment is configured such that the image-capturing unit 110 is rotatable with respect to the main body unit 100, and the image-capturing direction can be freely changed. When the image-capturing unit 110 is rotated to face the center of the main body unit 100 such that θ becomes equal to −90 degrees, not shown, the image-capturing apparatus 10 is automatically turned off. On the other hand, when θ becomes more than −90 degrees, the image-capturing apparatus 10 is automatically turned on.

Subsequently, an adapter 20 detachably attached to the image-capturing apparatus 10 according to the present embodiment will be explained with reference to FIGS. 4 and 5.

Figure 5:
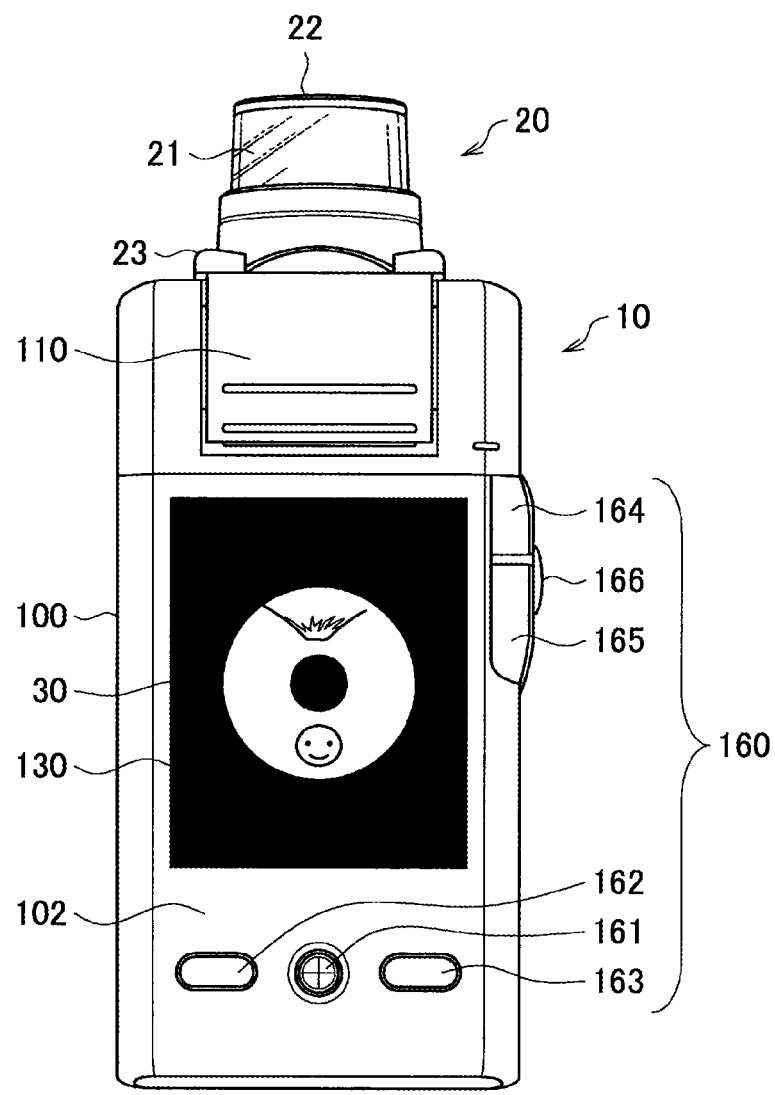
FIG. 5 is a rear view illustrating the image-capturing apparatus attached with the adapter according to the embodiment.

As shown in FIGS. 4 and 5, the detachable adapter 20 serving as an attachment for all-around image capturing can be attached to the image-capturing unit 110 in the image-capturing apparatus 10 according to the present embodiment. This adapter 20 includes an all-around image-capturing optical system 21 (see FIGS. 6 and 7) for capturing an image of subjects all around the image-capturing apparatus 10, a cylindrical cover 22 covering the all-around image-capturing optical system 21, and an engaging unit 23 for attaching the adapter 20 to the image-capturing apparatus 10. The engaging unit 23 has a shape capable of engaging with an attachment unit 117 provided on the front surface of the housing of the image-capturing unit 110. The adapter 20 can be attached and fixed to the image-capturing unit 110 by engaging two engaging claws 24 provided at both end portions of the engaging unit 23 toward the inner side in a protruding manner (see FIG. 7) with recessed portions 115 formed on both side surfaces of the attachment unit 117 of the image-capturing unit 110.

As shown in FIGS. 4 and 5, when the adapter 20 having the all-around image-capturing optical system 21 is attached to the image-capturing unit 110, the all-around image capturing can be achieved using the ordinary image-capturing apparatus 10 that does not have the all-around image-capturing optical system. This all-around image capturing process is a process for capturing an image of subjects existing all around the image-capturing apparatus 10 (0 degrees to 360 degrees). When the adapter 20 is attached to the image-capturing unit 110, a subject image of subjects all around the image-capturing unit 110 collected by the all-around image-capturing optical system 21 of the adapter 20 is incident upon the image-capturing optical system 111 of the image-capturing unit 110, and the subject image is formed on the image-capturing device 112.

As described above, when the adapter 20 is attached, both of the all-around image-capturing optical system 21 of the adapter 20 and the image-capturing optical system 111 of the image-capturing unit 110 are used to capture the subject image of the subjects all around the image-capturing apparatus 10 (all directions). In the above all-around image capturing using the all-around image-capturing optical system 21, as shown in FIG. 5, a ring-shaped image 30 obtained by capturing the image of the subjects all around the image-capturing apparatus 10 can be obtained, and the ring-shaped image 30 is displayed on the display unit 130 as a through image.

In the example of FIGS. 4 and 5, the adapter 20 is attached such that the image-capturing unit 110 is oriented upward (θ=90 degrees). In this case, the user holds the image-capturing apparatus 10 such that the display unit 130 of the main body unit 100 is substantially parallel to the vertical direction, and the user can capture an image of subjects all around the user, i.e., 360 degrees in the horizontal plane. While the adapter 20 is attached to the image-capturing unit 110, the image-capturing unit 110 can rotate to any rotation angle θ with respect to the main body unit 100 (see FIGS. 1 to 3). For example, the image-capturing unit 110 attached with the adapter 20 may rotate to the rotated state (θ=180 degrees) as shown in FIG. 3, and the image-capturing apparatus 10 may be placed on a desk while the display unit 130 is oriented upward. Therefore, for example, the image-capturing apparatus 10 can preferably capture an image of an all-around scenery of a conference where multiple people are sitting down around the desk in a meeting.

On the other hand, when the adapter 20 is not attached to the image-capturing unit 110 (see FIGS. 1 to 3), the image-capturing apparatus 10 performs the ordinary image-capturing using only the built-in ordinary image-capturing optical system 111 as the optical system. This ordinary image-capturing is a process for capturing an image of a subject existing in a particular direction when seen from the image-capturing apparatus 10 (image-capturing direction in which the optical axis 103 of the image-capturing optical system 111 is oriented) using only the ordinary image-capturing optical system 111. In this ordinary image-capturing, the subject image in the above one direction is incident via the ordinary image-capturing optical system 111 originally provided in the image-capturing apparatus 10, and the subject image is formed on the image-capturing device 112.

As described above, the adapter 20 according to the present embodiment is configured to be detachably attached to the image-capturing unit 110 of the image-capturing apparatus 10. Therefore, the user can easily achieve the all-around image capturing using the ordinary image-capturing apparatus 10 by just attaching the adapter 20 to the image-capturing unit 110.

[2. Configuration of All-Around Image-Capturing Optical System]

Figure 6:
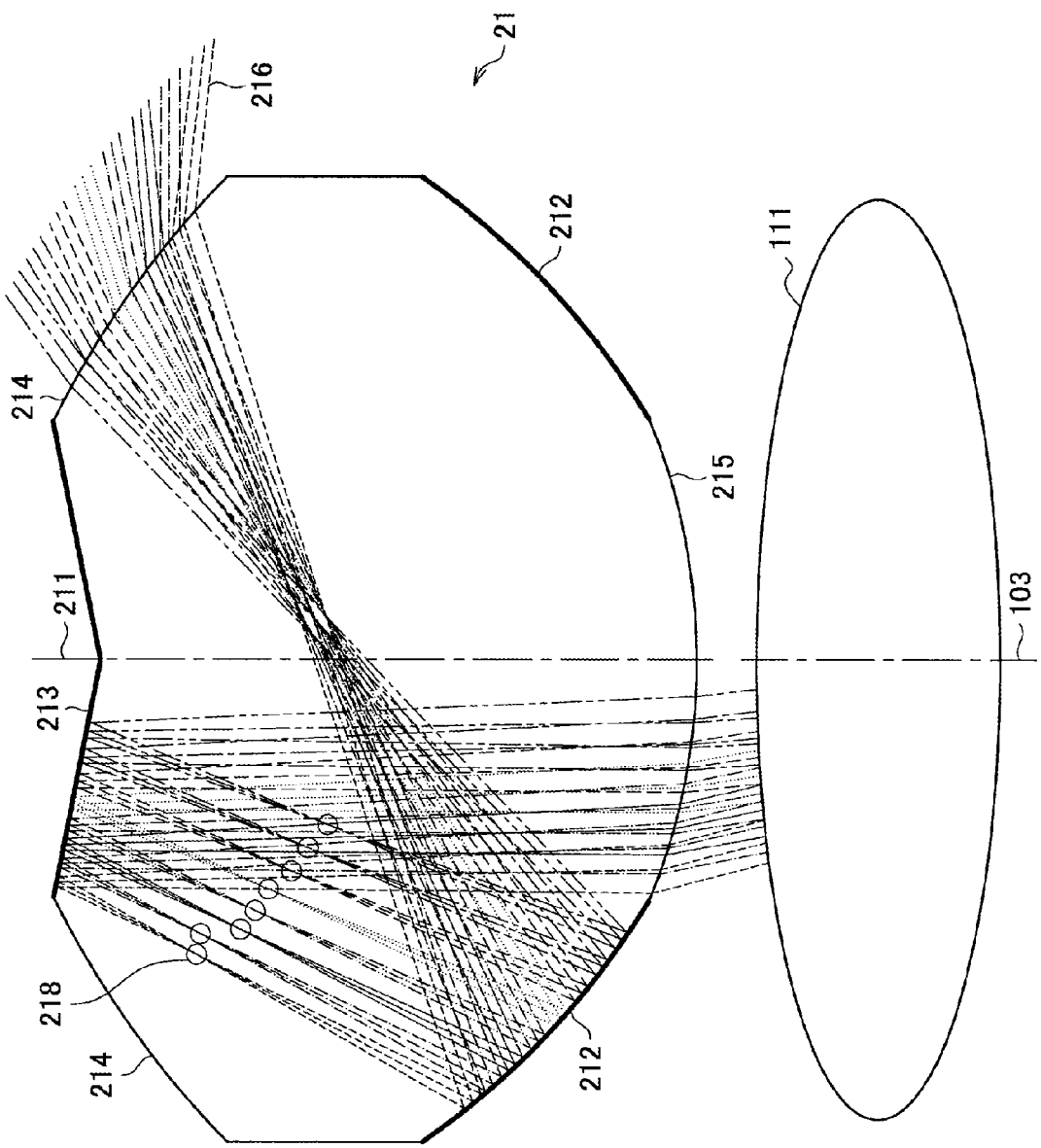
FIG. 6 is a cross sectional view illustrating a two-reflection-type all-around image-capturing optical system according to the embodiment.

Subsequently, an example of configuration of the all-around image-capturing optical system 21 provided in the adapter 20 according to the present embodiment will be explained with reference to FIG. 6. FIG. 6 is a cross sectional view illustrating a two-reflection-type all-around image-capturing optical system 21 according to the present embodiment.

As shown in FIG. 6, the all-around image-capturing optical system 21 (all-around image capturing lens) is constituted by a convex mirror and a concave minor having a rotationally symmetrical shape with respect to a central axis 211. The central axis 211 is arranged on the same line as the optical axis 103 of the image-capturing optical system 111 of the image-capturing unit 110. The all-around image-capturing optical system 21 includes a first reflection surface 212 in a ring shape provided at a lower portion, a second reflection surface 213 in a circular conical surface shape arranged to face the first reflection surface 212, a light entrance unit 214 in a ring shape arranged at an external periphery of the second reflection surface 213, and a light exit unit 215 arranged at an inner periphery of the first reflection surface 212. The first reflection surface 212 is made of a mirror-finished concave minor in a ring-shape, and the second reflection surface 213 is made of a mirror-finished convex minor. The light entrance unit 214 and the light exit unit 215 are made of transparent glass plates, which transmit light.

In the all-around image-capturing optical system 21 having such structure, incident light 216 is incident from the light entrance unit 214, and is reflected by the first reflection surface 212. Subsequently, the incident light 216 is reflected by the second reflection surface 213, and is output from the light exit unit 215. The output light from the light exit unit 215 is incident upon the image-capturing optical system 111 of the image-capturing unit 110, and is projected onto the image-capturing device 112. The all-around image-capturing optical system 21 having such configuration can reproduce the subject image in the range of 360 degrees about the central axis 211. Therefore, the all-around image-capturing optical system 21 can collect the subject image of subjects all around the all-around image-capturing optical system 21 (360 degrees), and can guide the subject image to the image-capturing optical system 111.

In the two-reflection-type all-around image-capturing optical system 21 as shown in FIG. 6, the optical properties of the all-around image-capturing optical system 21 is designed so that focal points 218 of the entire subject at any distance from the all-around image-capturing optical system 21 are located between the first reflection surface 212 and the second reflection surface 213. FIG. 6 shows the example of the two-reflection-type all-around image-capturing optical system 21. Alternatively, one-reflection-type all-around image-capturing optical system may be used.

The all-around image-capturing optical system 21 according to the present embodiment and the adapter 20 having the all-around image-capturing optical system 21 have been hereinabove explained. The all-around image capturing can be achieved using the ordinary image-capturing apparatus 10 by attaching the detachable adapter 20 to the image-capturing unit 110.

However, in the image-capturing apparatus 10, settings of image-capturing parameters for controlling zoom, focus, exposure, and the like are optimized according to characteristics of the image-capturing optical system 111 mounted on the image-capturing apparatus 10 in advance. Setting of display operation and setting of operation control in the image-capturing apparatus 10 are designed according to the characteristics of the image-capturing optical system 111. Therefore, when the adapter 20 is attached to the image-capturing apparatus 10 as an option, it is necessary to change the settings of image-capturing parameters and switch the settings of the display operation and the operation control in accordance with the characteristics of the all-direction image-capturing optical system 21 mounted on the adapter 20.

As described above, when the adapter 20 for all-direction image-capturing is attached to the ordinary image-capturing apparatus 10, it is necessary to change and set the image-capturing parameters and the like to appropriate values in accordance with the characteristics of the all-direction image-capturing optical system 21. Otherwise, when the ring-shaped image 30 obtained by the all-direction image-capturing process is reproduced, the ring-shaped image 30 may be distorted or blurred, and the user cannot obtain the ring-shaped image 30 as intended. However, it is difficult and cumbersome for an inexperienced user to perform operation for manually, appropriately setting various kinds of image-capturing parameters in accordance with the characteristics of the all-direction image-capturing optical system 21. From the point of view of user's convenience, the settings of the display operation and the operation control during the all-direction image-capturing process are preferably, automatically switched in accordance with whether or not the all-direction image-capturing adapter 20 is attached.

Accordingly, in view of such circumstances, the image-capturing apparatus 10 according to the present embodiment is configured to automatically control various kinds of settings of the image-capturing apparatus 10 in accordance with the characteristics of the all-around image-capturing optical system 21 when the adapter 20 is attached to the image-capturing unit 110. It should be noted that such automatic control of the settings of the image-capturing apparatus 10 will be explained later in detail.

[3. Configuration of Image-Capturing Apparatus]

Figure 7:
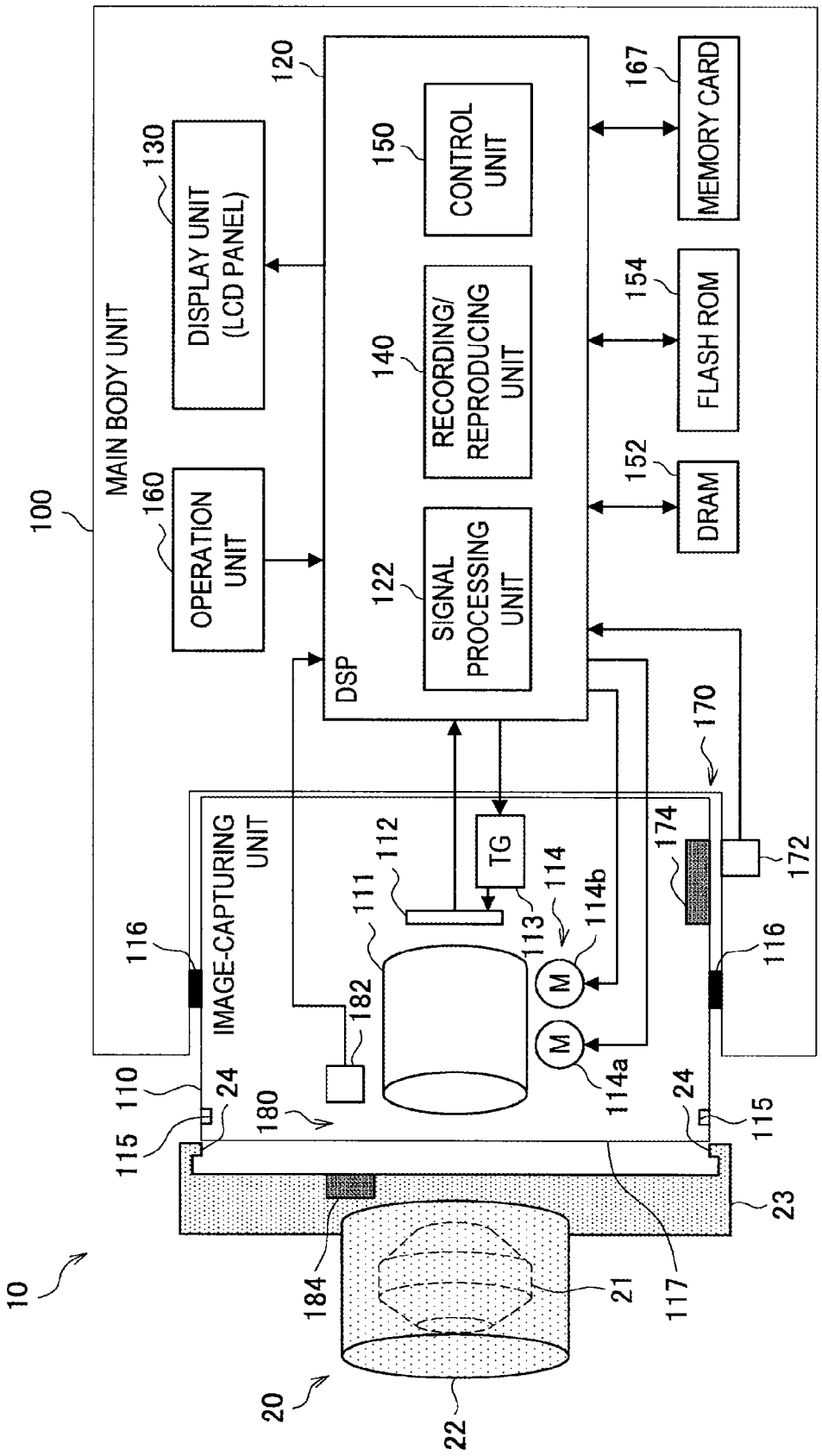
FIG. 7 is a schematic diagram illustrating a hardware configuration of the image-capturing apparatus according to the embodiment.

Subsequently, the configuration of the image-capturing apparatus 10 according to the present embodiment will be explained in detail with reference to FIG. 7. FIG. 7 is a schematic diagram illustrating a hardware configuration of the image-capturing apparatus 10 according to the present embodiment.

As shown in FIG. 7, the image-capturing apparatus 10 according to the present embodiment generally includes an image-capturing unit 110, a digital signal processor (DSP) 120, a display unit 130, and an operation unit 160. The DSP 120 functions as a signal processing unit 122, a recording/reproducing unit 140, and a control unit 150.

The image-capturing unit 110 has a function of capturing an image of a subject and outputting a captured image. The image-capturing unit 110 includes an image-capturing optical system 111, an image-capturing device 112, a timing generator 113, and an optical components drive unit 114.

The image-capturing optical system 111 is an ordinary optical system optically designed to capture an image of a subject in one direction. The image-capturing optical system 111 includes various kinds of lenses such as a focus lens and a zoom lens and optical components such as an optical filter for eliminating unnecessary wavelengths, an iris, and the like. The optical image (subject image) incident from the subject is formed on the exposure surface of the image-capturing device 112 via various optical components in the image-capturing optical system 111. For example, the image-capturing device 112 (image sensor) is constituted by solid image-capturing devices such as a charge coupled device (CCD) or a complementary metal oxide semiconductor (CMOS). This image-capturing device 112 photoelectrically converts the optical image guided by the image-capturing optical system 111, and outputs an electric signal (analog image signal) representing the captured image.

The image-capturing optical system 111 is mechanically connected to the optical components drive unit 114 for driving the optical components of the image-capturing optical system 111. For example, this optical components drive unit 114 includes a zoom motor 114a, a focus motor 114b, and the like. With the optical components drive unit 114, the zoom lens and the focus lens are moved, or the iris is adjusted. The optical components drive unit 114 drives the optical components of the image-capturing optical system 111 in accordance with an instruction given by the control unit 150 explained later. The timing generator (TG) 113 generates an operation pulse required by the image-capturing device 112 in accordance with an instruction given by the control unit 150. For example, the TG 113 generates various kinds of pulses such as four-phase pulse and field shift pulse for vertical transfer and two-phase pulse and shutter pulse for horizontal transfer and various other, and provides the pulses to the image-capturing device 112. When the image-capturing device 112 is driven by the TG 113, the image-capturing device 112 captures the subject image. When the TG 113 adjusts the shutter speed of the image-capturing device 112, the amount of exposure and the period of exposure of the captured image is controlled (electronic shutter function).

The digital signal processor (DSP) 120 is an arithmetic processing unit for performing image processing of the captured image and operation control of the image-capturing apparatus 10. The DSP 120 includes a signal processing unit 122. The image signal output from the image-capturing device 112 is input to the signal processing unit 122 of the DSP 120. The signal processing unit 122 executes predetermined signal processing on the image signal representing the captured image output from the image-capturing device 112, and outputs the processed image signal to the display unit 130 and the recording/reproducing unit 140. For example, the signal processing unit 122 includes an analog signal processing unit, an analog/digital conversion unit, and a digital signal processing unit which are not shown.

The analog signal processing unit is a so-called analog front end performing preprocessing on the image signal. For example, the analog signal processing unit performs gain processing on the image signal output from the image-capturing device 112, using correlated double sampling (CDS) processing and programmable gain amplifier (PGA). The A/D conversion unit converts the analog image signal input from the analog signal processing unit into a digital image signal, and outputs the digital image signal to the digital signal processing unit. The digital signal processing unit performs digital signal processing such as noise reduction, white balance adjustment, color correction, edge emphasis, and gamma correction, on the input digital image signal, and outputs the digital signal to the display unit 130, the recording/reproducing unit 140, and the like. In this explanation, for example, the signal processing unit 122 performs analog and digital signal processing. However, the present invention is not limited to such example. For example, the image-capturing device 112 may output the digital image signal, and the signal processing unit 122 may perform only the digital signal processing.

The display unit 130 is constituted by, for example, a liquid crystal display (LCD) and an organic EL display. The display unit 130 displays various kinds of image data which are input according to control of the control unit 150. For example, the display unit 130 displays captured images (through images) during image-capturing which are input in real-time from the signal processing unit 122 during image-capturing. Accordingly, the user can manipulate the image-capturing apparatus 10 while seeing the images on the display unit 130 during the image-capturing process. When a captured image recorded in a memory card 167 is reproduced by the recording/reproducing unit 140, the display unit 130 displays the reproduced image input from the recording/reproducing unit 140. Therefore, the user can check the contents of the captured images recorded in the memory card 167.

The recording/reproducing unit 140 records various kinds of data such as data of the captured images, metadata thereof, and the like to a recording medium such as the memory card 167, and reproduces the data recorded in the recording medium. In the example of FIG. 7, the memory card 167 detachably attached to the image-capturing apparatus 10 is shown as an example of a recording medium. However, the recording medium may be, for example, other semiconductor memories and disk-shaped recording medium such as optical disks and hard disks. Optical disks include, for example, Blu-ray Disc, a digital versatile disc (DVD), and a compact disc (CD). The recording medium may be provided in the image-capturing apparatus 10, or may be a removable medium detachably attached to the image-capturing apparatus 10.

The control unit 150 is constituted by an arithmetic processing unit such as a microcontroller provided in the DSP 120, and controls the entire operation of the image-capturing apparatus 10. The control unit 150 uses, for example, a dynamic random access memory (DRAM) 152 and a flash read only memory (ROM) 154 to execute control function.

The flash ROM 154 stores programs for executing various kinds of control processing of the control unit 150. The control unit 150 operates based on the program, and executes arithmetic/control processing required for each of the above controls using the DRAM 152. The program may be stored in a storage device (for example, flash ROM 154 and the like) provided in the image-capturing apparatus 10 in advance. The program may be stored in a removable recording medium such as a disk-shaped recording medium and a memory card, and may be provided to the image-capturing apparatus 10. Alternatively, the program may be downloaded to the image-capturing apparatus 10 via a network such as LAN and the Internet.

Now, specific example of control of the control unit 150 will be explained. The control unit 150 controls the optical components drive unit 114 and the TG 113 of the image-capturing unit 110, and controls the image-capturing operation of the image-capturing unit 110. For example, the control unit 150 controls automatic exposure (AE function) by adjusting the iris of the image-capturing optical system 111, setting the electronic shutter speed of the image-capturing device 112, and gain-setting the AGC of the signal processing unit 122. Further, the control unit 150 performs autofocus control (AF function) by moving the focus lens of the image-capturing optical system 111 and automatically adjusting the focal point of the image-capturing optical system 111 to a particular subject. In addition, the control unit 150 adjusts the angle of view of the captured image by moving the zoom lens of the image-capturing optical system 111. The control unit 150 also controls recording/reproducing processing of the captured image data by the recording/reproducing unit 140. The control unit 150 also performs display control for displaying various kinds of display data on the display unit 130.

The operation unit 160 functions as a user interface for manipulating the image-capturing apparatus 10. The operation unit 160 is constituted by, for example, various operation buttons, a touch panel, remote controller, and the like which are provided on the external housing of the image-capturing apparatus 10. The operation unit 160 outputs an instruction signal according to user operation to the control unit 150. The operation unit 160 includes, for example, the operation key 161, the preview button 162, the menu button 163, the release button 164, the record button 165, and the zoom switch 166, which are shown in FIGS. 1 to 5.

Subsequently, operation of the image-capturing apparatus 10 having the configuration as described above will be explained. The control unit 150 controls each unit of the image-capturing apparatus 10 by executing programs recorded in the flash ROM 154. As a result, various kinds of operations of the image-capturing apparatus 10 explained below are executed.

(1) Autofocus (AF) Control

When a subject image is incident upon the image-capturing device 112 via the image-capturing optical system 111, the image-capturing device 112 captures the subject image within the image-capturing range. That is, the image-capturing device 112 photoelectrically converts the optical image formed on the image-capturing surface by the image-capturing optical system 111, and outputs an analog image signal representing the captured image. At this image-capturing process, the control unit 150 processes the image signal within a predetermined AF detection frame in the captured image, thereby calculating a focal point position (focus position) at which the focal point of the image-capturing optical system 111 matches a particular subject within the AF detection frame and gives the focal point position (focus position) to the optical components drive unit 114. The optical components drive unit 114 activates the focus motor 114b on the basis of the instruction given by the control unit 150, and moves the focus lens, thereby automatically causing the focal point of the image-capturing optical system 111 to match the particular subject.

(2) Automatic Exposure (AE) Control

During the above image-capturing process, the control unit 150 calculates the amount of exposure suitable for the captured image during the image-capturing process on the basis of a signal level of the image signal within the predetermined AE detection frame in the captured image, and instructs the optical components drive unit 114 or the TG 113. The optical components drive unit 114 adjusts the degree of opening of the iris of the image-capturing optical system 111 on the basis of the instruction given by the control unit 150, thereby adjusting the amount of exposure of the subject image incident upon the image-capturing device 112. The TG 113 supplies the timing signal to the image-capturing device 112 on the basis of the instruction given by the control unit 150, and the shutter speed of the image-capturing device 112 is controlled on the basis of the timing signal. As a result, the exposure of the captured image is automatically controlled so that the brightness of the captured image becomes appropriate.

(3) Image Signal Processing

The signal processing unit 122 performs analog signal processing (e.g., amplification) the analog image signal output from the image-capturing device 112 on the basis of the control of the control unit 150, and thereafter performs A/D conversion on the digital image signal. Further, the signal processing unit 122 performs digital signal processing such as noise reduction, white balance adjustment, color correction, edge emphasis, and gamma correction, on the digital image signal on the basis of the control of the control unit 150.

(4) Display Processing of Captured Image

When the signal processing unit 122 outputs the processed image signal to the display unit 130, the display unit 130 displays a captured image (through image) in the image-capturing process represented by the image signal on the basis of the control of the control unit 150. When this through image (motion picture) is displayed, the user can see the image-capturing direction, the angle of view, the image-capturing state of the subject, and the like, and can record a captured image of a desired subject at a desired time. The display unit 130 also displays an image obtained by reproducing image data recorded in a recording medium on the basis of the control of the control unit 150.

(5) Recording Processing

The recording/reproducing unit 140 performs compressing/recording processing on the captured image on the basis of the control of the control unit 150. For example, when the record button 165 is pressed in a motion picture-capturing mode, the recording/reproducing unit 140 compresses the image signal representing the captured image (motion picture) by a predetermined compressing/encoding method such as joint photographic experts group (JPEG). The recording/reproducing unit 140 also records the compressed image signal to a recording medium as motion picture data. When the release button 164 is pressed in a still picture-capturing mode, the recording/reproducing unit 140 compresses the image signal representing the captured image (still picture) by a predetermined compressing/encoding method, and records it to a recording medium as still picture data, in response to a release signal given by the release button 164.

(6) Reproducing Processing

The recording/reproducing unit 140 reproduces the image recorded in the recording medium such as the memory card 167 on the basis of the control of the control unit 150. When a reproducing instruction is input from the operation unit 160 in the reproducing mode, the recording/reproducing unit 140 decompresses the compressed image data recorded in the recording medium, and outputs the obtained reproduced image signal to the display unit 130 and causes the display unit 130 to display the image.

(7) Various Kinds of Setting Processing

The image-capturing apparatus 10 performs setting processing of various kinds of functions of the image-capturing apparatus 10 and operation of the image-capturing apparatus 10 on the basis of external environment detected by various kinds of sensors and user operation performed with the operation unit 160. Examples of functions of the image-capturing apparatus 10 include zoom function, AF function, AE function, flash function, self-timer function, continuous shooting image-capturing function, adjusting function of the image quality and the image size of captured image, shutter speed, white balance, and the like, image-capturing auxiliary function, and display function.

[4. Configurations of Rotation Detection Unit and Attachment Detection Unit]

Subsequently, a rotation detection unit 170 for detecting the rotated state of the image-capturing unit 110 according to the present embodiment will be further explained with reference to FIG. 7.

As shown in FIG. 7, most of the constituent elements of the image-capturing apparatus 10 such as the DSP 120, the display unit 130, the operation unit 160, and a power source unit (not shown) are arranged within the housing of the main body unit 100 of the image-capturing apparatus 10. On the other hand, the image-capturing unit 110 is rotatably disposed such that the image-capturing unit 110 with respect to the main body unit 100 about the rotation axis 116 (see FIGS. 1 to 3).

The image-capturing apparatus 10 according to the present embodiment has the rotation detection unit 170 for detecting the rotated state, such as the rotation angle θ, of the image-capturing unit 110 with respect to the main body unit 100. The rotation detection unit 170 is embodied with, for example, a rotated state detection hole sensor 172 provided on the main body unit 100 and a magnet 174 provided on the image-capturing unit 110.

The rotated state detection hole sensor 172 is provided at a portion at the upper end of the main body unit 100 and adjacent to the image-capturing unit 110. The hole sensor 172 detects the magnetic flux density of the magnetic field generated by the magnet 174 provided on the image-capturing unit 110. On the other hand, the magnet 174 is provided at a portion away from the rotation axis 116 of the image-capturing unit 110.

With the above configuration, when the image-capturing unit 110 rotates about the rotation axis 116, the relative position between the hole sensor 172 and the magnet 174 is changed, and accordingly the magnitude and the direction of the magnetic field provided by the magnet 174 detected by the hole sensor 172 are also changed. Therefore, the rotated state (for example, the rotation angle θ, relative position, and the like of the image-capturing unit 110) of the image-capturing unit 110 with respect to the main body unit 100 can be detected by causing the hole sensor 172 to detect the magnitude and the direction of the magnetic field given by the magnet 174. The hole sensor 172 outputs a signal representing the detected magnitude and the detected direction of the magnetic field to the control unit 150, and the control unit 150 determines the rotated state of the image-capturing unit 110 on the basis of the magnitude and the direction of the magnetic field. It should be noted that the control unit 150 controls the reverse display function of the display by determining up, down, right and left directions of the captured image on the display unit 130 in accordance with the detected rotated state of the image-capturing unit 110, which will be explained later in detail.

Figure 8:
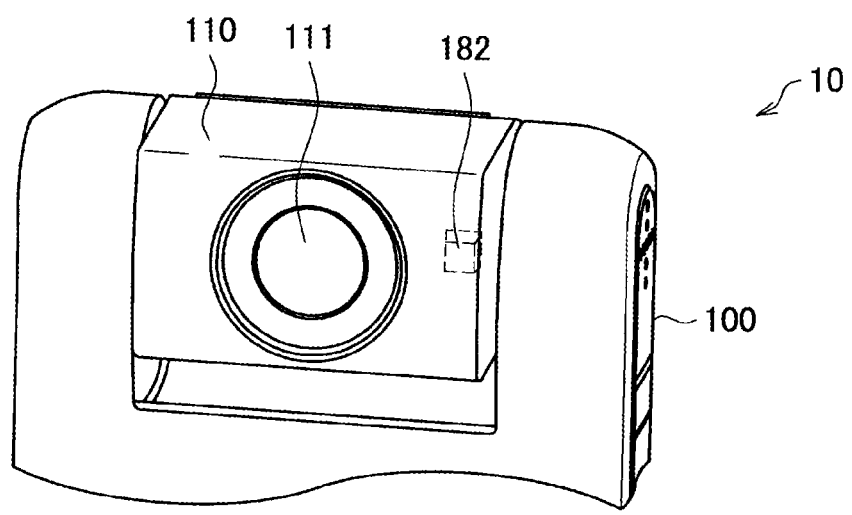
FIG. 8 is an enlarged perspective view illustrating an image-capturing unit of the image-capturing apparatus according to the embodiment.

Subsequently, an attachment detection unit 180 for detecting whether the adapter 20 is attached to the image-capturing unit 110 according to the present embodiment or not (which may be hereinafter referred to as "whether or not the adapter 20 is attached to the image-capturing unit 110") will be explained with reference to FIGS. 7 and 8.

As described above, in the present embodiment, the adapter 20 for capturing the image all around the image-capturing apparatus 10 is detachably attached to the image-capturing unit 110 of the image-capturing apparatus 10 (see FIG. 4). As shown in FIG. 7, the adapter 20 is detachably attached to the image-capturing unit 110 by engaging the engaging unit 23 of the adapter 20 with the attachment unit 117 provided on the front surface of the image-capturing unit 110 in the image-capturing direction. When the two engaging claws 24 provided on both ends of the engaging unit 23 of the adapter 20 in a protruding manner toward the inner side are engaged with the recessed portions 115 formed on both side surfaces of the housing of the image-capturing unit 110, the adapter 20 can be easily fixed to the front surface of the image-capturing unit 110.

The image-capturing apparatus 10 according to the present embodiment includes an attachment detection unit 180 for detecting whether the adapter 20 is attached to the image-capturing unit 110 or not. For example, as shown in FIGS. 7 and 8, this attachment detection unit 180 is embodied with, for example, an attachment detection hole sensor 182 provided on the image-capturing unit 110 of the image-capturing apparatus 10 and a magnet 184 provided on the adapter 20. The magnet 184 is embedded at one side of the engaging unit 23 of the adapter 20. The attachment detection hole sensor 182 is provided at a portion on the front surface side of the image-capturing unit 110 (front side in the image-capturing direction) and adjacent to the magnet 184 of the adapter 20. The hole sensor 182 detects the magnetic flux density of the magnetic field generated by the magnet 184 provided on the adapter 20.

In this configuration, when the adapter 20 is attached to the image-capturing unit 110 (see FIG. 4B), the magnet 184 is arranged in proximity to the hole sensor 182, and accordingly, the hole sensor 182 detects the magnetic field equal to or more than the predetermined magnetic flux density from the magnet 184. On the other hand, when the adapter 20 is not attached (see FIG. 4A), the hole sensor 182 does not detect the magnetic field equal to or more than the predetermined magnetic flux density from the magnet 184 of the adapter 20. Therefore, whether or not the adapter 20 is attached to the image-capturing unit 110 can be detected according to the magnetic field intensity detected by the hole sensor 182. The hole sensor 172 outputs a signal representing the detected magnetic field intensity to the control unit 150, and the control unit 150 determines the state as to whether the adapter 20 is attached to the image-capturing unit 110 (whether or not the adapter 20 is attached) on the basis of the magnetic field intensity. Then, the control unit 150 switches various kinds of operation settings of the image-capturing apparatus 10 in accordance with whether the adapter 20 is attached or not.

As described above, the image-capturing apparatus 10 according to the present embodiment detects the rotated state of the image-capturing unit 110 with respect to the main body unit 100 of the image-capturing apparatus 10 using the rotation detection unit 170, and detects whether the adapter 20 is attached to the image-capturing unit 110 using the attachment detection unit 180. Therefore, the control unit 150 can control the operation settings of the image-capturing apparatus 10 on the basis of the rotated state of the image-capturing unit 110 or whether the adapter 20 is attached or not. In this case, examples of operation settings of the image-capturing apparatus 10 include setting of image-capturing operation with the image-capturing unit 110 (for example, settings of image-capturing parameters with regard to image-capturing operation), setting of display operation with the display unit 130, and setting of control of user operation using the operation unit 160.

As described above, the control unit 150 switches various kinds of operation settings of the image-capturing apparatus 10 in accordance with the optical properties of the all-around image-capturing optical system 21 on the basis of whether or not the adapter 20 is attached. Therefore, when the adapter 20 is attached to the image-capturing unit 110 and the image-capturing apparatus 10 performs the all-around image capturing process, the operation settings of the image-capturing apparatus 10 can be automatically switched to the settings suitable for the optical properties of the all-around image-capturing optical system 21. Therefore, when the user simply attaches the adapter 20 to the image-capturing apparatus 10 without performing any special setting operation on the image-capturing apparatus 10, the image-capturing apparatus 10 is automatically controlled at an operation setting optimized for the all-around image capturing. A specific example for controlling the operation settings of the image-capturing apparatus 10 in accordance with the optical properties of the all-around image-capturing optical system 21 as described above will be explained later in detail.

[5. Control Method of Image-Capturing Apparatus]

Figure 9:
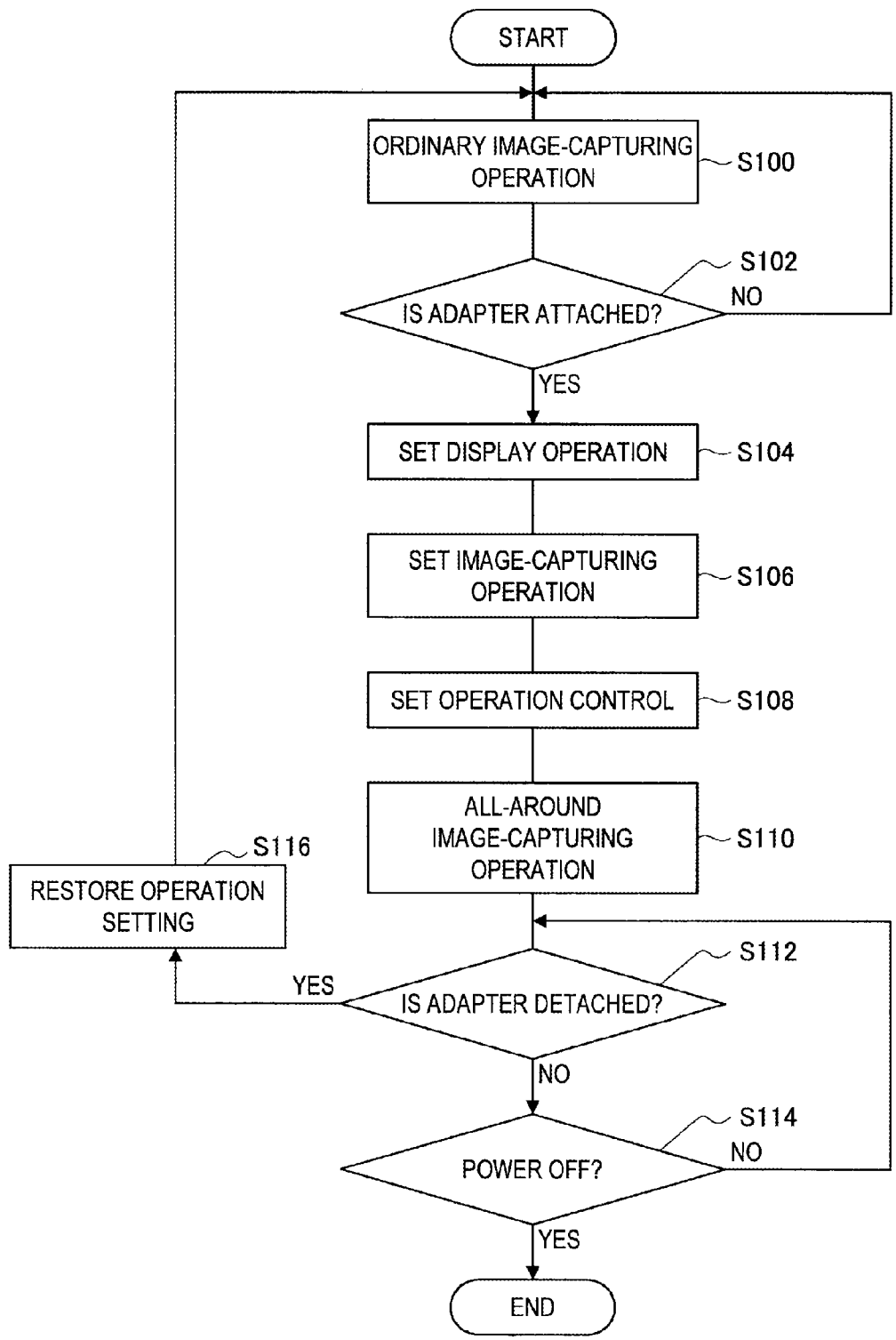
FIG. 9 is a flowchart illustrating the control method for image-capturing apparatus according to the embodiment.

Subsequently, a control method for the image-capturing apparatus 10 according to the present embodiment will be explained with reference to FIG. 9. FIG. 9 is a flowchart illustrating the control method for image-capturing apparatus 10 according to the present embodiment.

As shown in FIG. 9, first, when the adapter 20 is not attached to the image-capturing unit 110, the image-capturing apparatus 10 is set in the operation setting in accordance with the ordinary image-capturing, and performs the ordinary image-capturing operation using the ordinary image-capturing optical system 111 (S100). During this ordinary image-capturing operation, the attachment detection unit 180 of the image-capturing apparatus 10 constantly detects whether the adapter 20 is attached to the image-capturing unit 110 (S102). When the adapter 20 attached to the image-capturing unit 110 is detected as a result, the control unit 150 of the apparatus 10 switches the operation settings of the image-capturing apparatus 10 from the setting suitable for the ordinary image-capturing process to the setting suitable for the all-around image capturing process in steps S104 to S108 below.

First, the control unit 150 switches the setting of display operation of the display unit 130 from the setting suitable for the ordinary image-capturing operation to the setting suitable for the all-around image capturing operation (S104). The image-capturing apparatus 10 has a reverse display function for reversing and displaying the captured image in vertical and horizontal directions, which is displayed by the display unit 130, on the basis of the rotated state of the image-capturing unit 110 detected by the rotation detection unit 170. When the image-capturing direction of the image-capturing unit 110 and the display screen of the display unit 130 are in the same direction (for example, for the self-image-capturing) with this reverse display function, the captured image is reversed and displayed in the vertical direction and the horizontal direction. During the ordinary image-capturing in which the adapter 20 is not attached to the image-capturing unit 110, the control unit 150 enables the reverse display function. Therefore, the control unit 150 reverses and displays the captured image displayed on the display unit 130 in accordance with the rotated state of the image-capturing unit 110.

In contrast, when the attached adapter 20 is detected in S102, the control unit 150 disables the reverse display function, and sets the display unit 130 so that the display unit 130 does not reverse and display the captured image. The ring-shaped image 30 obtained by the all-around image capturing is different from a rectangular image obtained from the ordinary image-capturing in that the ring-shaped image 30 does not have any display direction serving as a reference, and it is not necessary to reverse and display the ring-shaped image 30. Accordingly, when the adapter 20 is attached, the reverse display function inappropriate for the all-around image capturing process is automatically disabled. Therefore, during the all-around image capturing using the all-around image-capturing optical system 21, this prevents occurrence of the reverse display that is not needed by the user.

Subsequently, the control unit 150 switches the settings of the image-capturing operation of the image-capturing unit 110 from the setting suitable for the ordinary image-capturing operation to the setting suitable for the all-around image capturing operation (S106). In this case, the settings of the image-capturing operation is switched by, for example, changing the settings of the image-capturing parameters applied in the image-capturing operation or changing the settings of the image-capturing auxiliary function (for example, enable/disable). Examples of image-capturing parameters include the setting value of the angle of view (for example, zoom position), the setting value of the AF control (for example, focus position), and the setting value of the AE control (for example, target brightness level). The image-capturing auxiliary functions include an image stabilization function for correcting camera shake during image-capturing process, a face detection function for detecting a face of a person in a captured image, and the like. When the above ordinary image-capturing operation (S100) is performed, the image-capturing parameter is set at a setting value suitable for the optical properties of the ordinary image-capturing optical system 111, and the image-capturing auxiliary function is enabled. However, when the all-around image capturing operation is performed with the adapter 20 attached, the image-capturing parameters are preferably changed to the setting values suitable for the characteristics of the all-around image-capturing optical system 21, and the settings of the image-capturing auxiliary function is preferably changed to the settings suitable for the characteristics of the all-around image-capturing optical system 21.

At this occasion, when the attached adapter 20 is detected in S102, the control unit 150 changes the image-capturing parameters to the setting values suitable for the optical properties of the all-around image-capturing optical system 21. Therefore, even when the user does not manually change the settings, the image-capturing parameters can be automatically changed to setting values suitable for the all-around image capturing process. The control unit 150 also changes the settings of the image-capturing auxiliary function to the settings suitable for the optical properties of the all-around image-capturing optical system 21. For example, the control unit 150 changes the algorithm of the image stabilization and disables inappropriate image-capturing auxiliary function in accordance with the optical properties of the all-around image-capturing optical system 21. Therefore, when the adapter 20 is attached, the settings of the image-capturing auxiliary function can be automatically changed to the settings suitable for the all-around image capturing process. As described above, according to the attachment of the adapter 20, the image-capturing apparatus 10 can automatically optimize the settings of the all-around image capturing operation of the image-capturing unit 110 in accordance with the optical properties of the all-around image-capturing optical system 21.

Further, the control unit 150 switches the settings of the operation control for controlling the user operation from the settings suitable for the ordinary image-capturing operation to the settings suitable for the all-around image capturing operation (S108). During the ordinary image-capturing, the user can manually change the operation settings and various functions of the image-capturing apparatus 10 using the operation unit 160. However, during the all-around image capturing, the quality of the captured image is deteriorated when the user tampers with the image-capturing parameters set according to the all-around image capturing process in the above S106 or enables a function inappropriate for the all-around image capturing (for example, the above reverse display function and the image-capturing auxiliary function).

For this reason, when the attached adapter 20 is detected in S102, the control unit 150 switches the settings of the user operation control to the settings of the operation control suitable for the all-around image capturing. Therefore, this prevents the user from changing the image-capturing parameters set in the S106, enabling functions inappropriate for the all-around image capturing, or disabling functions suitable for the all-around image capturing process. Therefore, during the all-around image capturing process, this prevents the deterioration of the captured image obtained by the all-around image capturing process, which is caused by intentional or unintentional user operation.

As described above, in steps S104 to S108, the control unit 150 changes the operation settings of the image-capturing apparatus 10 to the settings suitable for the all-around image capturing. Therefore, even when the user does not perform any difficult setting operation, the user simply attaches the adapter 20 to the image-capturing unit 110, so that the operation settings of the image-capturing apparatus 10 can be automatically changed from the settings suitable for the ordinary image-capturing to the settings suitable for the all-around image capturing. It should be noted that the order of execution of the above steps S104, S106, S108 is not limited the example as shown in the figures, and the above steps S104, S106, S108 may be executed in an arbitrary order.

Thereafter, the image-capturing apparatus 10 carries out the all-around image capturing operation in accordance with the switched operation settings (S110). This all-around image capturing operation continues until the adapter 20 is detached from the image-capturing unit 110 (S112) or the image-capturing apparatus 10 is turned off (S114).

During the all-around image capturing operation in S110, the attachment detection unit 180 of the image-capturing apparatus 10 constantly detects whether or not the adapter 20 is detached from the image-capturing unit 110 (S112). As a result, when the detached adapter 20 is detected, the control unit 150 changes the operation settings of the image-capturing apparatus 10, switched in the above S104 to S108, from the settings suitable for the all-around image capturing back to the settings suitable for the ordinary image-capturing (S116). Thereafter, back to S100, the image-capturing apparatus 10 carries out the ordinary image-capturing operation in accordance with the operation settings suitable for the ordinary image-capturing. Therefore, even when the user does not perform any difficult setting operation, the user simply detaches the adapter 20 from the image-capturing unit 110, so that the operation settings of the image-capturing apparatus 10 can be automatically changed from the settings suitable for the all-around image capturing to the settings suitable for the ordinary image-capturing.

[6. Optimization of Settings of Display Operation]

Figure 10:
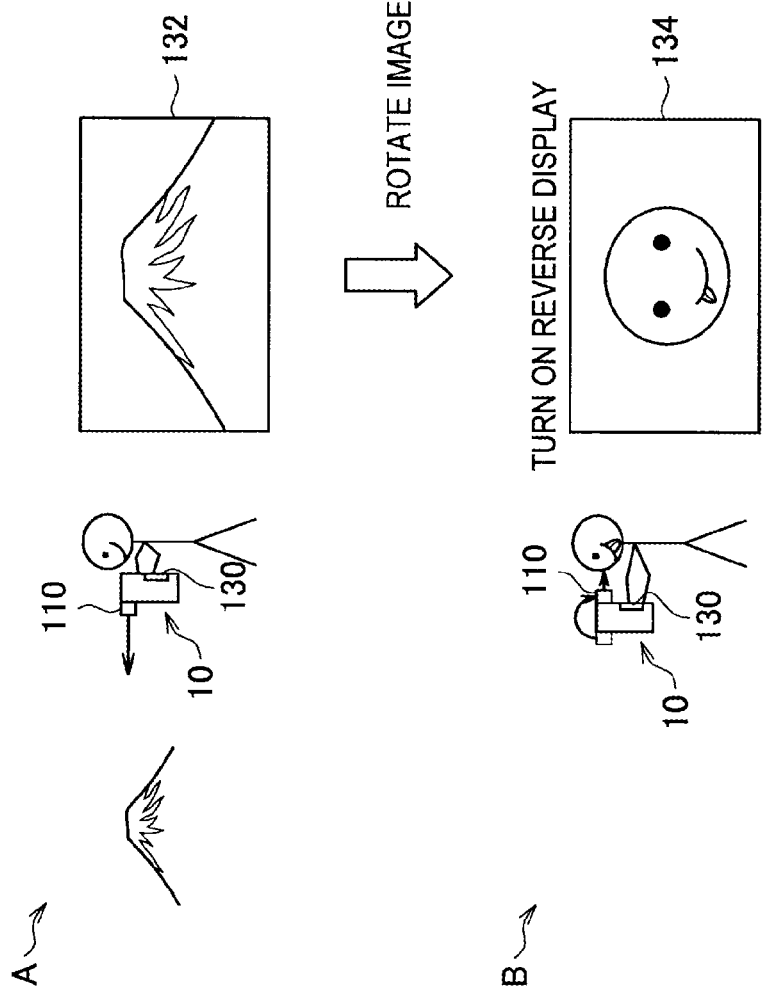
FIG. 10 is an explanatory diagram illustrating an enabled state of a reverse display function during ordinary image-capturing according to the embodiment.
Figure 11:
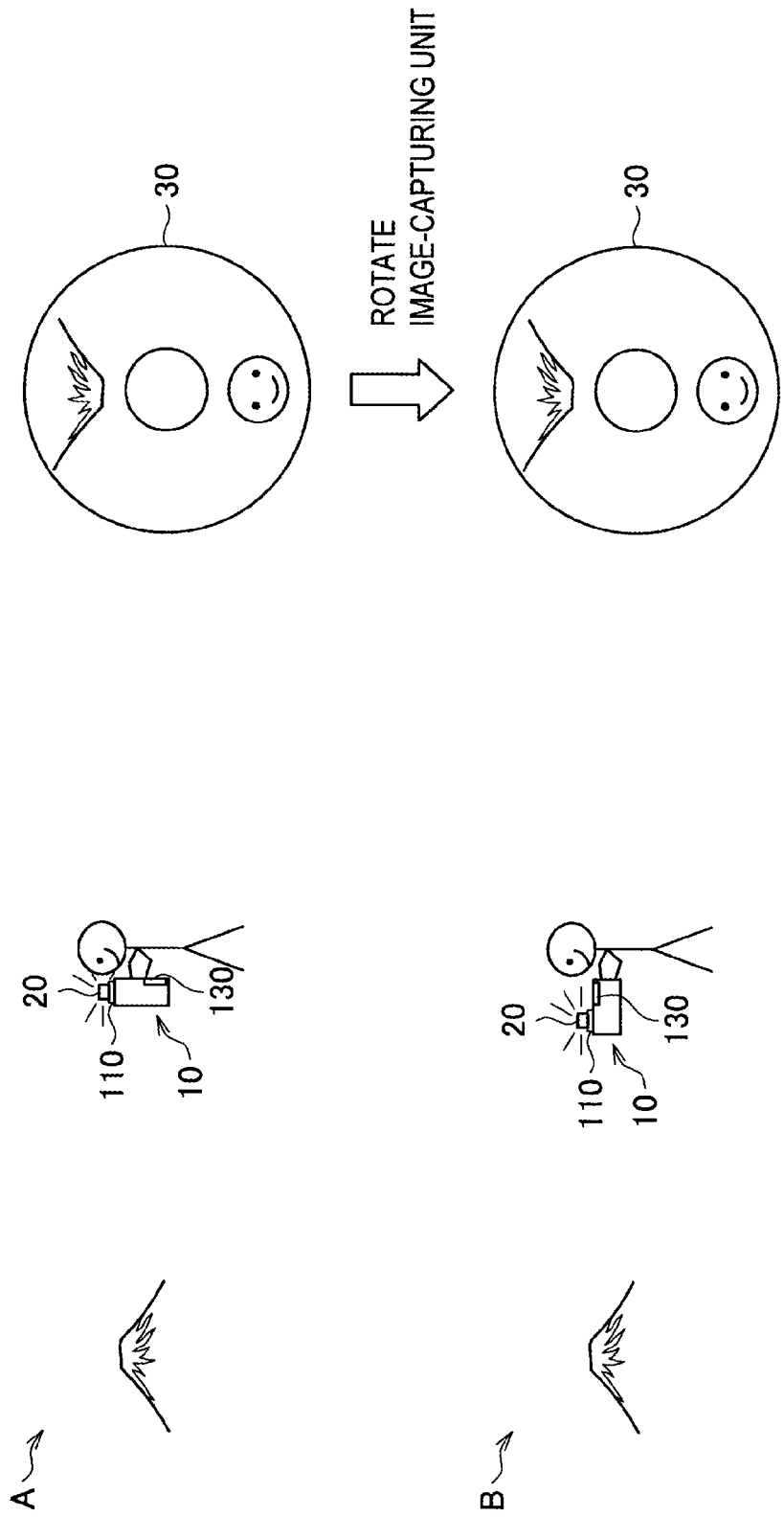
FIG. 11 is an explanatory diagram illustrating a disabled state of the reverse display function during all-around image capturing according to the embodiment.

Subsequently, a specific example of a method for controlling the settings of the display operation of the display unit 130 in accordance with whether the adapter 20 is attached or not will be explained in detail with reference to FIGS. 10 and 11. FIG. 10 is an explanatory diagram illustrating an enabled state of a reverse display function during the ordinary image-capturing according to the present embodiment. FIG. 11 is an explanatory diagram illustrating a disabled state of the reverse display function during the all-around image capturing according to the present embodiment.

As described above, the image-capturing apparatus 10 according to the present embodiment is configured such that the image-capturing unit 110 can rotate with respect to the main body unit 100, and the direction of the image-capturing unit 110 (image-capturing direction) and the direction of the display screen of the display unit 130 can be changed. With the image-capturing apparatus 10 having the above rotation mechanism, when the image-capturing unit 110 and the display unit 130 are oriented in the same direction as shown in FIG. 3, the user (photographer) can capture an image of the user himself/herself (self-image-capturing process) while seeing the through image of the user himself/herself displayed on the display unit 130. The user captures an image of the user himself/herself with the image-capturing apparatus 10 having such self-image-capturing function employs a method for causing the display unit 130 to reverse and display the captured image in the vertical direction and the horizontal direction, thus displaying the captured image naturally to the user.

The reverse display function during this ordinary image-capturing process will be explained with reference to FIG. 10. As shown in FIG. 10A, while the image-capturing unit 110 faces front surface direction of the image-capturing apparatus 10 (rotation angle θ is 0 degree), the image-capturing apparatus 10 captures an image of Mount Fuji, i.e., a subject located in the front surface direction of the image-capturing apparatus 10, and the display unit 130 displays a captured image 132 of Mount Fuji. In this case, the rotation angle θ of the image-capturing unit 110 is less than the reference angle $θ_0$ (for example, $θ_0$ is 120 degrees). Therefore, the control unit 150 disables the reverse display function. Therefore, the captured image 132 is not reversed in the vertical direction and the horizontal direction.

On the other hand, when the image-capturing unit 110 is rotated so that the image-capturing unit 110 faces the back surface direction of the image-capturing apparatus 10 as shown in FIG. 10B (rotation angle θ=180 degrees), the image-capturing unit 110 captures an image of the face of the user himself/herself located in the back surface direction of the image-capturing apparatus 10, and the display unit 130 displays a captured image 134 of the user himself/herself. In this case, the rotation angle θ of the image-capturing unit 110 is equal to or more than the reference angle $θ_0$ (for example, $θ_0$ is 120 degrees), the control unit 150 enables the reverse display function. Therefore, with the reverse display function, the captured image 134 is reversed and displayed in the vertical direction and the horizontal direction. For reference, FIG. 10B also shows a captured image 136 that is not reversed and displayed. As described above, in the self-image-capturing in which the rotation angle θ is about 180 degrees, the captured image 134 reversed in the vertical direction and the horizontal direction is displayed on the display unit 130, so that the display unit 130 displays the face of the user himself/herself as if the face is reflected in the minor, which allows the user to easily adjust the angle of view.

However, the following problem occurs when the image-capturing apparatus 10 having the rotation mechanism and the reverse display function of the above image-capturing unit 110 performs the all-around image capturing with the adapter 20 attached to the image-capturing unit 110. That is, in the all-around image capturing process as shown in FIG. 11, a ring-shaped image 30 obtained by capturing an image of subjects all around the image-capturing apparatus 10 (360 degrees) is obtained as a captured image. The ring-shaped image 30 obtained from this all-around image capturing does not have any display direction serving as a reference, and there is no directionality natural to the photographer. In other words, the captured images 132, 134 obtained by the ordinary image-capturing as shown in FIG. 10 have display directions serving as references (that is, a lower side of the subject in the vertical direction preferably matches a downward direction of the display image.). However, the ring-shaped image 30 as shown in FIG. 11 does not have any display direction serving as a reference since the ring-shaped image 30 is an image obtained by capturing an image all around the image-capturing apparatus 10 within the horizontal plane.

The above reverse display function is unnecessary in the all-around image capturing in which this kind of ring-shaped image 30 can be obtained. In other words, if the reverse display function is configured to be turned on/off in accordance with the rotated state of the image-capturing unit 110 during the all-around image capturing like the ordinary image-capturing process of FIG. 10, the ring-shaped image 30 is reversed and displayed in a direction different from the display direction until then in accordance with change of the rotation angle θ of the image-capturing unit 110. As a result, the user feels the change of the image-capturing direction due to the reversal of the ring-shaped image 30, and the display operation of the image-capturing apparatus 10 appears to be an unnatural behavior to the user.

For example, a case will be considered where the user holds the image-capturing apparatus 10 in a longitudinal direction, and the all-around image capturing process is performed while the rotation angle θ of the image-capturing unit 110 attached with the adapter 20 is 90 degrees as shown in FIGS. 11A and 12A. In this case, as shown in FIGS. 11B and 12B, the user then holds the image-capturing apparatus 10 such that the image-capturing apparatus 10 lies in a horizontal direction and manually rotates the image-capturing unit 110 toward the user to set the rotation angle θ of 180 degrees in order to capture an image of the same scenery all around the user. When the display reverse function is enabled at this occasion, the ring-shaped image 30 is reversed in vertical and horizontal directions and displayed on the display unit 130. In this case, even though the user captures the images of the same scenery while the user faces the same direction, the user feels that the ring-shaped image 30 awkwardly reversed and displayed.

Accordingly, in order to solve the above problem of the reversed display, the image-capturing apparatus 10 according to the present embodiment is configured such that the control unit 150 disables the reverse display function when the attachment detection unit 180 detects the adapter 20 attached. Therefore, even when the image-capturing unit 110 is rotated during the all-around image capturing process so as to change the direction of the image-capturing unit 110 (image-capturing direction), the image-capturing apparatus 10 according to the present embodiment can prevent unnatural behavior, e.g., abrupt change of the display direction of the ring-shaped image 30 on the display unit 130. Therefore, the user can perform the all-around image capturing without any awkwardness using the image-capturing apparatus 10 having the adapter 20.

In the above reverse display function, the captured image is reversed in the vertical direction and the horizontal direction. However, the present invention is not limited to such example. For example, the reverse display function may reverse the captured image only in the vertical direction. Alternatively, when the rotation direction of the image-capturing unit 110 is in horizontal direction with respect to the main body unit 100, the reverse display function may be configured to reverse the captured image only in the horizontal direction.

[7. Optimization of Setting of Image-Capturing Operation]

Subsequently, a specific example of a method for controlling the settings of the image-capturing operation of the image-capturing unit 110 in accordance with the optical properties of the all-around image-capturing optical system 21 when the all-around image capturing is performed with the adapter 20 attached to the image-capturing unit 110 will be explained in detail.

[7.1. Optimization of Angle of View]

First, the optimization of the angle of view of a captured image during the all-around image capturing process will be explained. When the control unit 150 of the image-capturing apparatus 10 detects the adapter 20 attached to the image-capturing unit 110, the control unit 150 controls the angle of view of the captured image (i.e., ring-shaped image 30) obtained from the all-around image capturing in accordance with the optical properties of the all-around image-capturing optical system 21 of the adapter 20. Examples of control methods for controlling the angle of view suitable for the all-around image capturing include (1) control of the angle of view based on the zoom position and (2) control of the angle of view based on the image size, as explained later.

(1) Control of the Angle of View Based on Zoom Position

The size of a subject image projected onto the image-capturing surface of the image-capturing device 112 is uniquely determined according to the design of the optical properties of the all-around image-capturing optical system 21 of the adapter 20 attached to the image-capturing unit 110. However, when the image-capturing apparatus 10 has a zoom mechanism, the size of the subject image projected onto the image-capturing device 112 is changed according to the position of the zoom lens of the image-capturing optical system 111 (hereinafter referred to as zoom position).

The subject image projected onto the image-capturing device 112 via the image-capturing optical system 111 from the all-around image-capturing optical system 21 is not in a rectangular shape which is obtained in the ordinary image-capturing, but is in a ring shape. When such ring-shaped subject image is captured, the ring-shaped image 30 as shown in FIG. 5 can be obtained. For example, when the zoom position is at a position at a telescopic-side (for example, telescopic end) at which the angle of view of the captured image is reduced during such all-around image capturing, the subject image projected onto the image-capturing device 112 increases, and the outer peripheral portion of the ring-shaped image 30 obtained from the all-around image capturing is lost. For this reason, in order to prevent the ring-shaped image 30 obtained in the all-around image capturing process from being partially lost, it is necessary to control the zoom position in accordance with the optical properties of the all-around image-capturing optical system 21 and optimize the angle of view of the captured image.

Accordingly, when the control unit 150 of the image-capturing apparatus 10 according to the present embodiment detects the adapter 20 attached to the image-capturing unit 110, the control unit 150 automatically moves the zoom lens of the image-capturing optical system 111 to a predetermined position suitable for the optical properties of the all-around image-capturing optical system 21. In other words, the control unit 150 optimizes the zoom position of the image-capturing optical system 111 in accordance with the optical properties of the all-around image-capturing optical system 21. Therefore, the angle of view of the captured image obtained from the all-around image capturing process (i.e., ring-shaped image 30) can be controlled at the appropriate angle of view. This appropriate angle of view is an angle of view at which the size of the ring-shaped image 30 is the maximum size and the ring-shaped image 30 is not partially lost. A specific example of control method for controlling the zoom position will be subsequently explained.

(1.1) Specific Example 1 of Control Method for Zoom Position

A control method for the angle of view for moving the zoom position to attain the maximum angle of view when the adapter 20 is attached will be explained. First, the optical properties of the all-around image-capturing optical system 21 of the adapter 20 attached is designed in advance so that, at the zoom position at which the angle of view of the captured image becomes the maximum angle of view with the zoom mechanism of the image-capturing optical system 111 (for example, wide end), the subject image projected onto the image-capturing device 112 via the all-around image-capturing optical system 21 and the image-capturing optical system 111 is not partially lost and the size of the subject image is the maximum. Then, when the adapter 20 attached to the image-capturing unit 110 is detected, the control unit 150 controls the zoom motor 114*a* to move the position of the zoom lens (zoom position) to the wide end. Therefore, the angle of view of ring-shaped image 30 can be optimized (maximum angle of view) in accordance with the optical properties of the all-around image-capturing optical system 21.

(1.2) Specific Example 2 of Control Method for Zoom Position

Subsequently, a control method for the angle of view for moving the zoom position to attain the most suitable angle of view set in advance when the adapter 20 is attached will be explained. First, the zoom position at which the subject image projected onto the image-capturing device 112 via the all-around image-capturing optical system 21 and the image-capturing optical system 111 is not partially lost and the size of the subject image is the maximum is stored to a storage unit of the image-capturing apparatus 10 in advance. The zoom position is a zoom position most suitable for the optical properties of the all-around image-capturing optical system 21. Then, when the adapter 20 attached to the image-capturing unit 110 is detected, the control unit 150 controls the zoom motor 114*a* to move the position of the zoom lens (zoom position) to the zoom position stored in advance. Accordingly, the angle of view of the ring-shaped image 30 is optimized in accordance with the optical properties of the all-around image-capturing optical system 21.

(1.3) Specific Example 3 of Control Method for Zoom Position

Subsequently, a control method for the angle of view for obtaining the most appropriate angle of view by image processing of the captured image when the adapter 20 is attached will be explained. First, when the adapter 20 attached to the image-capturing unit 110 is detected, the control unit 150 evaluates the size of the subject image projected onto the image-capturing device 112 via the all-around image-capturing optical system 21 and the image-capturing optical system 111 using image processing technique for the captured image while gradually moving the zoom position from the telescopic end to the wide end. Then, the control unit 150 obtains a zoom position at which the size of the subject image is the maximum size and the subject image is not partially lost, and fixes the zoom position. For example, the control unit 150 fixes the zoom position as soon as the size of the ring-shaped image 30 obtained from the all-around image capturing process changes from the state of occupying the entire image frame (partially lost state) to the state of fitting within the image frame. As described above, when the actually captured ring-shaped image 30 is processed, the angle of view of the captured image is optimized such that the ring-shaped image 30 attains the maximum size without being partially lost regardless of the type of the attached all-around image-capturing optical system 21.

(2) Control of the Angle of View Based on Image Size

The image-capturing apparatus 10 such as a digital still camera can change the image size of the captured image recorded by the recording unit, and supports the recording of a plurality of image sizes. In this case, the image size is represented as the number of pixels of the captured image (for example, the number of pixels of the entire image and the number of pixels in the vertical and horizontal directions of the image). For example, the number of pixels of the captured image (motion picture) in the vertical and horizontal directions may be 1920×1080 pixels, 1280×720, and the like. The control unit 150 of the image-capturing apparatus 10 sets the image size of the recorded captured image to an image size specified by a user from among a plurality of image sizes or an image size automatically selected.

The image-capturing apparatus 10 may change the image size read from the image-capturing device 112 in accordance with change of the image size. For example, when an image-capturing device 112 of which the number of pixels is 5 M pixels and of which angle of view is 4:3 is used to generate a captured image of 1920×1080 pixels, a central portion of the image-capturing device 112 is cut out. When the same image-capturing device 112 is used to generate a captured image of 1280×720 pixels, a method for combining outputs of two pixels in the vertical direction and two pixels in the horizontal direction, i.e., totally four pixels, into one pixel is used. The image sizes on the image-capturing device 112 in the respective cases are 1920×1080 pixels and 2560×1440 pixels, which are different from each other. Therefore, when the image sizes are changed, the angles of view of the captured images output from the image-capturing device 112 are different.

Accordingly, when the adapter 20 is attached to the image-capturing unit 110, the control unit 150 of the image-capturing apparatus 10 according to the present embodiment automatically changes the setting of the image size to a particular image size suitable for the optical properties of the all-around image-capturing optical system 21. With such switching of the setting of the image size, the angle of view of the captured image can be controlled at the angle of view suitable for the all-around image capturing process.

More specifically, first, the optical properties of the all-around image-capturing optical system 21 of the adapter 20 are designed according to a particular image size. Then, when the adapter 20 attached to the image-capturing unit 110 is detected, the control unit 150 selects a particular image size according to the optical properties of the all-around image-capturing optical system 21 from among the plurality of image sizes that can be set and changed, and automatically switches the setting of the image size to a particular image size suitable for the optical properties of the all-around image-capturing optical system 21. Therefore, the angle of view of the captured image is automatically optimized in accordance with the all-around image-capturing optical system 21 of the attached adapter 20. As a result, within the captured image recorded as the particular image size, the ring-shaped image 30 is not partially lost and the size of the ring-shaped image 30 becomes the maximum.

[7.2. Optimization of Focus Control]

Subsequently, the optimization of the focus position during the all-around image capturing process and the autofocus control will be explained. When the control unit 150 of the image-capturing apparatus 10 detects the adapter 20 attached to the image-capturing unit 110, the control unit 150 controls the focal point position of the image-capturing optical system 111 (focus position) in accordance with the optical properties of the all-around image-capturing optical system 21 of the adapter 20, thus bringing the captured image obtained from the all-around image capturing process into focus (i.e., ring-shaped image 30). The focus control methods of the image-capturing apparatus 10 according to the present embodiment is different according to whether, for example, (1) the ordinary image-capturing or (2) the all-around image capturing is carried out, as explained later in detail.

(1) Focus Control During Ordinary Image-Capturing Process (When No Adapter is Attached)

First, autofocus control during the ordinary image-capturing using the ordinary image-capturing optical system 111 without attaching the adapter 20 to the image-capturing unit 110 of the image-capturing apparatus 10 will be explained.

As shown in FIG. 13, in the ordinary autofocus control, the control unit 150 controls the position of the focus lens so that the focal point of the image-capturing optical system 111 matches a subject in a wide range such as long range, short range, or close proximity. For this reason, when the control unit 150 determines that the focal point does not match the subject which is currently being captured, the control unit 150 performs the autofocus control over the wide range so as to search the position in focus. Therefore, since the control target range is broad, the focal point may be incorrectly determined.

As shown in FIG. 14, when an image of an ordinary scenery is captured in which subjects are present in long range, short range, close proximity, and the like in a mixed manner, close subjects are concentrated in a lower portion of the captured image 138, and many far subjects are concentrated in an upper portion of the captured image 138. On the other hand, subjects desired by the user tend to be present in around a middle portion 139 of the captured image 138. In view of such circumstances, in the autofocus control during the ordinary image-capturing, the focus control is performed so that the focal point is selectively brought to subjects in around the middle portion 139. Therefore, this increases the chance of bringing the focal point to a subject desired by the user.

(2) Focus Control During all-Around Image Capturing Process (When Adapter is Attached)

Focus control for performing the all-around image capturing using both of the ordinary image-capturing optical system 111 and the all-around image-capturing optical system 21 of the adapter 20 upon attaching the adapter 20 to the image-capturing unit 110 of the image-capturing apparatus 10 will be explained.

(2.1) During All-Around Image Capturing Process Using One-Reflection-Type All-Around Image-Capturing Optical System Examples of types of all-around image-capturing optical systems include the two-reflection-type all-around image-capturing optical system 21 as shown in FIG. 6 and the one-reflection-type all-around image-capturing optical system 25 as shown in FIG. 15. The latter, i.e., the one-reflection-type all-around image-capturing optical system 25, has one reflection surface 26 for reflecting light from a subject, and the reflection surface 26 is constituted by a convex minor having a rotationally symmetrical shape with respect to the central axis.

As shown in FIG. 15, when the all-around image capturing is performed using the one-reflection-type all-around image-capturing optical system 25, the focal point distance of the image-capturing optical system 111 is about the same distance as that when the adapter 20 is not attached, as if an image of a subject reflected on a mirror is captured.

However, since the captured image in a ring shape (circular donut-shaped) obtained by capturing subjects all around the image-capturing apparatus 10 (i.e., ring-shaped image 30) can be obtained, a portion of the adapter 20 itself appears inside of the subjects in the ring-shaped image 30. Likewise, outside of the subject in the ring-shaped image 30, a portion of the adapter 20 itself is captured as an image. Therefore, it is necessary to exclude these portions from the target area of the image evaluation for the focus control so that the focal point is not brought to these portions.

Many subjects in short range are concentrated at the inner periphery of the ring-shaped image 30, and many subjects in long range are concentrated at the outer periphery of the ring-shaped image 30. Accordingly, in the ring-shaped image 30 of FIG. 15, a portion corresponding to the middle portion 139 of the captured image 138 during the ordinary image-capturing of FIG. 14 is a ring-shaped portion 32 around the center of the ring-shaped image 30. Therefore, when the all-around image capturing is performed using the adapter 20 having the one-reflection-type all-around image-capturing optical system 25, it is necessary to change the evaluation target region of the autofocus control within the captured image to a range different from the range for the ordinary image-capturing process.

Accordingly, during the all-around image capturing, the control unit 150 of the image-capturing apparatus 10 according to the present embodiment limits the evaluation target region of the autofocus control to the ring-shaped portion 32 around the center of the ring-shaped image 30, and performs the autofocus control so that the focal point is brought to a subject appearing in the ring-shaped portion 32. More specifically, the control unit 150 calculates a focal point position (focus position) matching a subject appearing in the ring-shaped portion 32 within the ring-shaped image 30, and instructs the focal point position to the optical components drive unit 114. The optical components drive unit 114 drives the focus motor 114b and moves the focus lens on the basis of the instruction given by the control unit 150, and automatically brings the focal point of the image-capturing optical system 111 and the all-around image-capturing optical system to a subject appearing in the ring-shaped portion 32.

With the autofocus control, the ring-shaped image 30 can be automatically obtained in which the adapter 20 itself is not appearing and the focal point is on the ring-shaped portion 32 including a subject desired by the user.

(2.2) During All-Around Image Capturing Using Two-Reflection-Type All-Around Image-Capturing Optical System Subsequently, focus control using the adapter 20 having the two-reflection-type all-around image-capturing optical system 21 as shown in FIG. 6 will be explained.

The two-reflection-type all-around image-capturing optical system 21 have such optical properties that the focal points of the entire subject at any distance from the all-around image-capturing optical system 21 are concentrated inside of or in proximity to the all-around image-capturing optical system 21. For example, the two-reflection-type all-around image-capturing optical system 21 as shown in FIG. 6 is optically designed such that the focal points 218 of the entire subject are located between the two reflection surfaces 212, 213 in the all-around image-capturing optical system 21. When the two-reflection-type all-around image-capturing optical system 21 is attached to the image-capturing unit 110, the distance between the all-around image-capturing optical system 21 and the image-capturing optical system 111 of the image-capturing apparatus 10 are in extremely close proximity. Therefore, when the adapter 20 is attached, it is necessary to bring the focal point position of the image-capturing optical system 111 into extremely close proximity to the image-capturing optical system 111 (macro position).

Accordingly, when the adapter 20 is attached to the image-capturing unit 110, the control unit 150 controls the focal point position (focus position) of the image-capturing optical system 111 such that the focal point position is at a particular position at the short range side or in proximity thereto (for example, the position of the focal point 218 inside of the all-around image-capturing optical system 21 or in proximity thereto). The adjustment range of the focal point position during the ordinary image-capturing is wide (from the macro position to the position at infinity). In contrast, the adjustment range of the focal point position during the all-around image capturing is a limited range, i.e., only at the particular position or in proximity thereto (for example, the position of the focal point 218 within the all-around image-capturing optical system 21 or in proximity thereto, such as several centimeters from the image-capturing optical system 111). For example, during the all-around image capturing, the control unit 150 may fix the focal point position of the image-capturing optical system 111 at a position at the shortest range side (macro position) within the range in which the focus control mechanism of the image-capturing apparatus 10 can perform adjustment. Alternatively, the control unit 150 may adjust the focal point position of the image-capturing optical system 111 within the range including the particular position or those in proximity thereto.

With the above focus control, the focus position of the image-capturing optical system 111 can be brought to the focal points 218 of the entire subject within the above all-around image-capturing optical system 21. Therefore, the focus position can be optimized in accordance with the optical properties of the all-around image-capturing optical system 21, and the ring-shaped image 30 focused on the subject captured with the all-around image capturing process can be automatically obtained.

In the autofocus control during the ordinary image-capturing in which the adapter 20 is not attached, the adjustment range of the focal point position of the image-capturing optical system 111 with the autofocus function (range in which the focal point distance at which the subject is focused on is searched with the AF function) is a wide range from the macro position to the position at infinity as shown in FIG. 13. However, during the all-around image capturing in which the adapter 20 is attached, the appropriate focal point position is limited to the inside of the all-around image-capturing optical system 21 or in proximity thereto as described above, and therefore, it is not necessary to set the focus position in the long range. Therefore, when the autofocus control is performed in the wide range during the all-around image capturing using the adapter 20 just like the ordinary image-capturing process, the chance of erroneous control may increase.

Accordingly, when the adapter 20 is attached to the image-capturing unit 110, the control unit 150 limits the adjustment range of the focal point position with the AF function to only the predetermined range in proximity to the image-capturing optical system 111. The predetermined range in proximity to the image-capturing optical system 111 is, for example, the position of the focal point 218 within the all-around image-capturing optical system 21, or the range in proximity thereto, or the range around the macro position. As described above, during the all-around image capturing, the autofocus control is performed upon limiting the adjustment range of the focal point position of the image-capturing optical system 111 to the range in proximity to the image-capturing optical system 111. Therefore, the chance of false determination is eliminated, and this can prevent erroneous control of the autofocus function.

The focus control during the all-around image capturing using the two-reflection-type all-around image-capturing optical system 21 has been hereinabove explained. It should be noted that the all-around image-capturing optical system may be a system reflecting light of a subject three times or more as long as the system have such optical properties that the focal points of the entire subject at any distance from the all-around image-capturing optical system are located inside of or in proximity to the all-around image-capturing optical system.

[7.3. Optimization of Exposure Control]

Subsequently, optimization of exposure control during the all-around image capturing will be explained. Automatic exposure (AE) control is a common example of exposure control of the image-capturing apparatus 10. In this AE control, exposure control suitable for the subject is executed by changing parameters of the AE control in accordance with the subject to be captured and the ambient environment around the image-capturing apparatus 10.

With the all-around image capturing using the adapter 20, the ring-shaped image 30 obtained by capturing subjects all around the image-capturing apparatus 10 can be obtained as shown in FIG. 5. This ring-shaped image 30 exists only in a central portion of the rectangular captured image that is output from the image-capturing device 112. As described above, during the all-around image capturing, the region showing the subject in the rectangular captured image is limited to a central ring-shaped region (ring-shaped image 30), and is different from the region showing the subject with the ordinary image-capturing. Therefore, during the all-around image capturing, the evaluation target region of the automatic exposure control is preferably changed from the evaluation target range for the ordinary image-capturing (for example, the entire region of the rectangular captured image), so that the region other than the ring-shaped image 30 in the captured image is excluded from the evaluation target range of the exposure control.

Accordingly, when the adapter 20 is attached to the image-capturing unit 110, the control unit 150 of the image-capturing apparatus 10 limits the evaluation target region of the automatic exposure control in the captured image to the region within the ring-shaped image 30, so that the region other than the ring-shaped image 30 in the captured image (region filled in black in FIG. 5) is excluded from the evaluation target region. Therefore, only the region of the ring-shaped image 30 showing the subject all around the image-capturing apparatus 10 is adopted as the evaluation target region of the automatic exposure control, and the control unit 150 uses the brightness values of the pixels in the ring-shaped image 30 to automatically control the exposure of the ring-shaped image 30. This allows appropriately controlling the brightness of the ring-shaped image 30 without being affected by the region other than the ring-shaped image 30.

[7.4. Disabling Image-Capturing Auxiliary Functions]

Subsequently, disabling image-capturing auxiliary functions during the all-around image capturing will be explained. The image-capturing auxiliary functions are functions for helping the image-capturing operation with the image-capturing unit 110. Examples of image-capturing auxiliary functions include an image stabilization function for correcting the instability of the captured image caused by user's camera shake during the image-capturing and a face detection function for detecting the face of a person in the captured image.

In the ordinary image-capturing apparatus 10 having the image stabilization function, the camera shake detection and correction processing are controlled in accordance with the ordinary image-capturing using only the ordinary image-capturing optical system 111, and this does not involve the control suitable for the all-around image capturing using the all-around image-capturing optical system 21. Therefore, if the image stabilization function controlled according to the ordinary image-capturing is maintained as it is during the all-around image capturing process in which the adapter 20 is attached, an appropriate ring-shaped image 30 may not be obtained.

Accordingly, when the adapter 20 is attached to the image-capturing unit 110, the control unit 150 of the image-capturing apparatus 10 disables the image stabilization function. Therefore, during the all-around image capturing, the inappropriate image stabilization processing is not performed on the ring-shaped image 30. This allows obtaining the appropriate ring-shaped image 30.

During the ordinary image-capturing, the focus control and the exposure control using the face detection function are performed. Therefore, the focal point can be brought to the face of a person in the captured image, and the exposure can be controlled so that the face of a person in the captured image attains an appropriate brightness level. However, during the all-around image capturing using the adapter 20, the image of the subject is captured while the image is distorted or flipped upside down or in the horizontal direction. Therefore, in many cases, correct face detection may not be performed. Moreover, false detection may occur due to the distortion of the subject.

Accordingly, when the adapter 20 is attached to the image-capturing unit 110, the control unit 150 of the image-capturing apparatus 10 disables the face detection function. Therefore, during the all-around image capturing, the inappropriate face detection processing is not performed on the ring-shaped image 30 in which the subject is distorted, and this prevents false detection, and solves problems of the focus control and the exposure control caused by the false detection.

As described above, when the adapter 20 is attached to the image-capturing unit 110, the control unit 150 disables the image-capturing auxiliary functions inappropriate for the all-around image capturing among those used for the ordinary image-capturing. Therefore, during the all-around image capturing, malfunction caused by the inappropriate image-capturing auxiliary functions are prevented, and the ring-shaped image 30 of adequate image quality can be obtained.

[8. Optimization of Settings of Operation Control]

Subsequently, optimization of settings of operation control for controlling user operation performed on the operation unit 160 during the all-around image capturing will be explained. As described above, when the adapter 20 is attached to the image-capturing apparatus 10 according to the present embodiment, the image-capturing apparatus 10 optimizes the settings of the image-capturing operation (image-capturing parameters such as the angle of view, focus, and exposure) and the settings of the display operation in accordance with the optical properties of the all-around image-capturing optical system 21. However, even though various kinds of settings are optimized as described above, the suitable settings may not be maintained due to user's erroneous operation.

Accordingly, when the adapter 20 is attached to the image-capturing unit 110, the control unit 150 of the image-capturing apparatus 10 automatically optimizes the settings of the all-around image capturing operation and the settings of the display operation, and thereafter disables the user operation for changing the optimized settings. For example, the control unit 150 controls the user operation such that, even when the user operates the operation unit 160 of the image-capturing apparatus 10, the user cannot set and change the optimized image-capturing parameters such as the angle of view, focus, and exposure and ON/OFF state of the display reverse function. Therefore, this prevents the user from manually changing the automatically optimized operation settings, in accordance with whether the adapter 20 is attached or not, and prevents user's erroneous operation, so that the most suitable operation settings of the image-capturing apparatus 10 can be maintained during the all-around image capturing process.

[9. Another Embodiment of Image-Capturing Apparatus]

Figure 16:
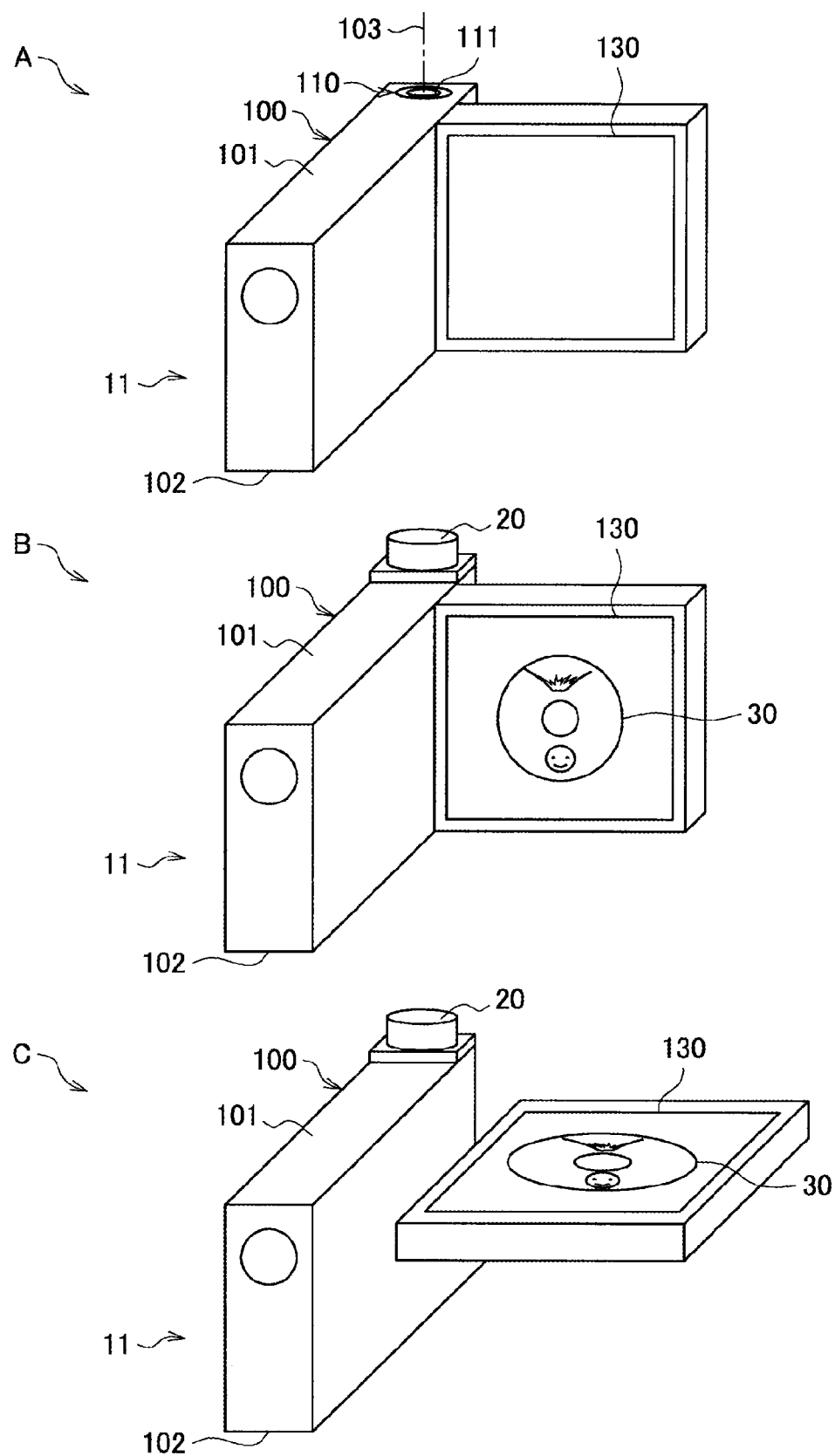
FIG. 16 is a perspective view illustrating a rotated state of a display unit of an image-capturing apparatus according to the second embodiment of the present invention.

Subsequently, an image-capturing apparatus 11 according to the second embodiment of the present invention will be explained with reference to FIG. 16. FIG. 16 is a perspective view illustrating the image-capturing apparatus 11 according to the second embodiment of the present invention.

The image-capturing apparatus 11 according to the second embodiment is different from the image-capturing apparatus 10 according to the first embodiment in that the image-capturing apparatus 11 according to the second embodiment has a rotation mechanism for rotating a display unit 130 instead of the image-capturing unit 110. The remaining functional configuration of the image-capturing apparatus 11 according to the second embodiment is substantially same as the first embodiment, and detailed explanation thereabout is omitted.

As shown in FIG. 16, the image-capturing apparatus 11 according to the second embodiment has a rotation mechanism for rotating the display unit 130 with respect to a main body unit 100. When the display unit 130 is rotated with this rotation mechanism, the display screen of the display unit 130 can be oriented in a desired direction such as the front surface 101 (image-capturing direction side), the rear surface 102 (photographer's side), and the upper side of the image-capturing apparatus 11. In the ordinary image-capturing, the display screen of the display unit 130 is oriented toward the rear surface 102 of the image-capturing apparatus 11, so that the user (photographer) can capture the image of a subject while seeing a captured image displayed on the display unit 130. During the self-image-capturing process, the display screen of the display unit 130 is oriented toward the front surface 101 of the image-capturing apparatus 11, so that the user can capture the image of the user himself/herself while seeing the captured image of the user displayed on the display unit 130.

The image-capturing apparatus 11 has a reverse display function explained in FIG. 10, and during the self-image-capturing, the captured image displayed by the display unit 130 is reversed and displayed in vertical and horizontal directions with the reverse display function. The rotation detection unit 170 according to the first embodiment (see FIG. 7) detects the rotated state of the image-capturing unit 110 with respect to the main body unit 100. In contrast, the rotation detection unit 170 according to the second embodiment detects the rotated state of the display unit 130 with respect to the main body unit 100 (rotation angle θ). The control unit 150 reverses and displays the captured image on the basis of the rotated state of the display unit 130. For example, when the display screen of the display unit 130 is oriented in the direction opposite to the image-capturing direction (θ=0 degrees), the control unit 150 does not reverse and display the captured image on the display unit 130. On the other hand, when the display screen of the display unit 130 is oriented in the image-capturing direction (θ=180 degrees), this is the self-image-capturing, and accordingly the control unit 150 reverses and displays the captured image on the display unit 130.

Subsequently, all-around image capturing using the above image-capturing apparatus 11 will be explained. Although the image-capturing unit 110 of the image-capturing apparatus 11 as shown in FIG. 16 is a fixed type which does not rotate (see FIG. 16A), the detachable adapter 20 can be attached to the image-capturing unit 110 like the first embodiment (see FIGS. 16B, 16C). As described above, when the adapter 20 is attached to the image-capturing unit 110, the image-capturing apparatus 11 can perform the all-around image-capturing optical system 21 using the all-around image-capturing optical system 21 of the adapter 20. The image-capturing apparatus 10 is arranged so that the optical axis 103 of the image-capturing optical system 111 (image-capturing direction) is oriented upward during the all-around image capturing as shown in FIG. 16, so that the image-capturing apparatus 10 can capture an image of subjects all around the image-capturing apparatus 10 within the horizontal plane including the adapter 20 (360 degrees).

Hereinafter, control of the reverse display function on the basis of whether or not the adapter 20 is attached will be explained. As shown in FIG. 16B, during the all-around image capturing in which the adapter 20 is attached to the image-capturing unit 110, the control unit 150 disables the reverse display function. Therefore, as shown in FIGS. 16B and 16C, even when the display unit 130 rotates with respect to the main body unit 100, the ring-shaped image 30 displayed on the display unit 130 is not reversed, and the display direction does not change.

As described above, when the adapter 20 is not attached to the image-capturing apparatus 11 according to the second embodiment, the image-capturing apparatus 11 reverses and displays the captured image on the display unit 130 in accordance with the rotated state of the display unit 130, but when the adapter 20 is attached, the image-capturing apparatus 11 does not reverse and display the captured image on the display unit 130 regardless of the rotated state of the display unit 130. Therefore, during the all-around image capturing using the adapter 20, this can prevent unnatural behavior, e.g., change of the display direction of the ring-shaped image 30 caused by the rotating the display unit 130.

In the reverse display function in the example of FIG. 16, the captured image is reversed in the vertical direction and the horizontal direction. However, the reverse display function according to the present invention is not limited to such example. For example, when the display unit 130 is reversed and raised with respect to the main body unit 100 (self-image-capturing mode of FIG. 16C), the captured image is reversed in the vertical direction and the horizontal direction. However, when the display unit 130 is reversed and laid on the main body unit 100 (display panel reverse/closed mode), the captured image may be reversed only in the vertical direction. The aspect of the reverse display function (reversing the captured image only in the horizontal direction or reversing the captured image only in the vertical direction) may be changed as necessary according to the attachment structure of the display unit with respect to the main body unit of the image-capturing apparatus 11.

[10. Conclusion]

As described above, the image-capturing apparatuses 10, 11 according to the preferred embodiments of the present invention and the control methods thereof have been explained. According to the present embodiments, the detachable adapter 20 having the all-around image-capturing optical system 21 can be detachably attached to the image-capturing units 110 of the image-capturing apparatuses 10, 11. Therefore, when the adapter 20 is not attached, the image-capturing apparatuses 10, 11 can perform the ordinary image-capturing operation for capturing an image of a subject in one direction, using the image-capturing optical system 111. On the other hand, when the adapter 20 is attached, the image-capturing apparatuses 10, 11 can perform the all-around image capturing operation for capturing subjects in all directions (all directions around the image-capturing apparatuses 10, 11) using the all-around image-capturing optical system 21 and the image-capturing optical system 111.

Further, the attachment detection unit 180 of the image-capturing apparatuses 10, 11 detects whether the adapter 20 is attached to the image-capturing unit 110. The control unit 150 switches the operation settings of the image-capturing apparatus 10 (settings of image-capturing operation, display operation, operation control, and the like) on the basis of whether the adapter 20 is attached or not, thereby automatically controlling the most suitable operation settings according to the optical properties of the all-around image-capturing optical system 21 or the image-capturing optical system 111. In other words, during the ordinary image-capturing in which the adapter 20 is not attached, the control unit 150 controls the operation settings of the image-capturing apparatuses 10, 11 to change them to the settings suitable for the ordinary image-capturing process (settings according to the optical properties of the ordinary image-capturing optical system 111). On the other hand, during the all-around image-capturing optical system 21 in which the adapter 20 is attached, the control unit 150 controls the operation settings of the image-capturing apparatus 10 to change them to the settings suitable for the all-around image-capturing process (settings according to the optical properties of the all-around image-capturing optical system 21).

For example, when the adapter 20 is not attached, the control unit 150 enables the reverse display function for reversing and displaying the captured image in accordance with the rotated state of the image-capturing unit 110, and when the adapter 20 is attached, the control unit 150 disables the reverse display function. Therefore, during the all-around image capturing using the adapter 20, the ring-shaped image 30 obtained from the all-around image capturing is not reversed and displayed even when the image-capturing unit 110 is rotated and the image-capturing direction is changed. Therefore, the all-around image capturing can be performed without any unnatural behavior, e.g., change of the display direction of the ring-shaped image 30 on the display screen. As described above, in the image-capturing apparatuses 10, 11 having the self-image-capturing function, the display control of the self-image-capturing (reverse display function) does not reduce the ease of operation during the all-around image capturing.

On the other hand, when the adapter 20 is not attached, the control unit 150 optimizes the settings of the ordinary image-capturing operation with the image-capturing unit 110 in accordance with the optical properties of the ordinary image-capturing optical system 111. On the other hand, when the adapter 20 is attached, the control unit 150 optimizes the settings of the all-around image capturing operation in accordance with the optical properties of the all-around image-capturing optical system 21. In this case, the settings of the image-capturing operation include the setting of the angle of view, the setting of the focus control, the setting of the exposure control, the setting of ON/OFF of the image-capturing auxiliary function, and the like, which are described above, and can be achieved with the settings of image-capturing parameters such as the zoom position, the focal point position, and the exposure control. As described above, when the adapter 20 is attached, the control unit 150 automatically changes the settings of the all-around image capturing operation to the settings suitable for the optical properties of the all-around image-capturing optical system 21. Therefore, the user can easily perform the all-around image-capturing using the ordinary image-capturing apparatuses 10, 11 without performing particularly difficult setting operation by just attaching the detachable adapter 20 to the image-capturing apparatuses 10, 11. In addition, during the all-around image capturing, the zoom position, the focal point position, the exposure, and the like are automatically optimized. Therefore, when the ring-shaped image 30 obtained from the all-around image capturing process is reproduced, the user can enjoy the ring-shaped image 30 as intended.

Further, when the adapter 20 is attached, the control unit 150 disables user operation for manually changing the operation settings (e.g., settings of image-capturing parameters) automatically optimized in accordance with the all-around image capturing. Therefore, this prevents a user inexperienced in handling of the image-capturing apparatus 10 from changing the settings by erroneous operation to the operation settings not suitable for the all-around image-capturing optical system 21.

The preferred embodiments of the present invention have been described above with reference to the accompanying drawings, whilst the present invention is not limited to the above examples, of course. A person skilled in the art may find various alternations and modifications within the scope of the appended claims, and it should be understood that they will naturally come under the technical scope of the present invention.

For example, in the above embodiments, the two-reflection-type all-around image-capturing optical system 21 and the one-reflection-type all-around image-capturing optical system 25 have been explained. However, the all-around image-capturing optical system of the invention of the present application is not limited to such example. For example, an all-around image-capturing optical system 21 reflecting light from a subject three times or more may be employed. The shapes of the reflection surface, the transmission surface, and the like of the all-around image-capturing optical system are not limited to the examples shown in the figures, and the design thereof can be changed as desired.

The attachment detection unit 180 according to the above embodiments detects whether the adapter 20 is attached or not using a magnetic sensor such as the hole sensor 182. However, the configuration of the attachment detection unit of the present invention is not limited to such example. For example, any detection device such as a physical switch and an optical sensor may be used. An example of an attachment detection unit using a physical switch will be explained. A protrusion is provided on the engaging unit 23 of the adapter 20 at the side of the image-capturing apparatus 10, and an electrical switch is provided on the image-capturing unit 110 of the image-capturing apparatus 10, so that the electrical switch is pressed by the protrusion of the engaging unit 23 when the adapter 20 is attached. The output of the electrical switch is electrically connected to the control unit 150. Whether the adapter 20 is attached to the image-capturing unit 110 or not can be physically detected with the attachment detection unit having such configuration. Likewise, the rotation detection unit 170 is not limited to the magnetic sensor. For example, any detection device such as a physical switch and an optical sensor may be used.

REFERENCE SIGNS LIST 10, 11 Image-capturing apparatus
20 Adapter
21, 25 All-around image-capturing optical system
22 Cover
23 Engaging unit
24 Engaging claw
30 Ring-shaped image
32 Ring-shaped portion
100 Main body unit
110 Image-capturing unit
111 Image-capturing optical system
112 Image-capturing device
113 TG
114 Optical components drive unit
115 Recessed portion
116 Rotation axis
117 Attachment unit
120 DSP
122 Signal processing unit
130 Display unit
140 Recording/reproducing unit
150 Control unit
160 Operation unit
170 Rotation detection unit
172 Hole sensor
174 Magnet
180 Attachment detection unit
182 Hole sensor
184 Magnet
211 Central axis
212 First reflection surface
213 Second reflection surface
214 Light entrance unit
215 Light exit unit

The invention claimed is:
1. An apparatus comprising:
a main body unit;
an image-capturing unit arranged to be rotatable with respect to the main body unit and comprising an image sensor and an optical system optically coupled to the image sensor, wherein the image-capturing unit is configured to detachably couple with an adapter optic configured to provide a 360° field-of-view;
a rotation detection unit configured to detect a rotated state of the image-capturing unit with respect to the main body unit;
a display unit configured to display a captured image that is output from the image sensor;
an attachment detection unit configured to detect whether or not the adapter optic is coupled to the image-capturing unit; and
a control unit,
wherein, when the adapter optic is not coupled to the image-capturing unit, the control unit is configured to initiate a reverse display function for the display unit, in which the captured image is reversed on the display unit, on the basis of the rotated state being detected by the rotation detection unit, and wherein the control unit is configured to disable, in response to the attachment detection unit detecting that the adapter optic is coupled to the image-capturing unit, the reverse display function.

2. The apparatus according to claim 1,
wherein the display unit is arranged to be rotatable with respect to the main body unit of the apparatus,
wherein the rotation detection unit is configured to detect a rotated state of the display unit with respect to the main body unit, and
wherein, when the adapter optic is not coupled to the image-capturing unit, the control unit is configured to initiate the reverse display function for the display unit on the basis of the rotated state of the display unit being detected by the rotation detection unit.

3. The apparatus according to claim 1, wherein when the adapter optic is not coupled to the image-capturing unit, the control unit is configured to set a first plurality of operating settings representing a first mode of operation of the apparatus, and
when the adapter optic is coupled to the image-capturing unit, the control unit is configured to set a second plurality of operating settings representing a second, 360° field-of-view, mode of operation of the apparatus.

4. The apparatus according to claim 3, wherein when the adapter optic is coupled to the image-capturing unit, the control unit controls an angle of view of the captured image obtained from the second mode of operation.

5. The apparatus according to claim 4, wherein when the adapter optic is coupled to the image-capturing unit, the control unit controls the angle of view of the captured image by moving a zoom lens of the optical system to a predetermined position.

6. The apparatus according to claim 4, wherein when the adapter optic is coupled to the image-capturing unit, the control unit controls the angle of view of the captured image by changing the image size.

7. The apparatus according to claim 3, wherein the control unit is configured to change a control method for a focal point position of the optical system on the basis of whether or not the adapter optic is coupled to the image-capturing unit.

8. The apparatus according to claim 7, wherein a focal point of the adapter optic is positioned inside of or in proximity to the adapter optic.

9. The apparatus according to claim 8, wherein when the adapter optic is coupled to the image-capturing unit, the control unit limits an adjustment range of the focal point position of the optical system with an autofocus function to remain inside of or in proximity to the adapter optic.

10. The apparatus according to claim 3, wherein when the adapter optic is coupled to the image-capturing unit, the control unit limits an evaluation target region of an exposure control of the captured image output from the image sensor to a region within a ring-shaped image obtained from the second mode of operation.

11. The apparatus according to claim 1, wherein the control unit is configured to change settings of an image-capturing auxiliary function on the basis of whether or not the adapter optic is coupled to the image-capturing unit.

12. A control method for an apparatus including an image-capturing unit configured to detachably couple with an adapter optic configured to provide a 360° field-of-view, the control method comprising:
  detecting whether or not the adapter optic is coupled to the image-capturing unit; and
  in response to detecting that the adapter optic is coupled to the image-capturing unit, disabling a reverse display function of the apparatus in which a captured image displayed on a display unit of the apparatus is reversed on the display unit as a result of the apparatus detecting that the image-capturing unit is rotated relative to a body of the apparatus.

13. A non-transitory computer readable storage device comprising a program for an apparatus including an image-capturing unit configured to detachably couple with an adapter optic configured to provide a 360° field-of-view, the program causing the image-capturing apparatus to execute the steps of:
  detecting whether or not the adapter optic is coupled to the image-capturing unit; and
  in response to detecting that the adapter optic is coupled to the image-capturing unit, disabling a reverse display function of the apparatus in which a captured image displayed on a display unit of the apparatus is reversed on the display unit as a result of the apparatus detecting that the image-capturing unit is rotated relative to a body of the apparatus.

14. The apparatus according to claim 1, wherein when the adapter optic is attached to the image-capturing unit, the control unit limits an evaluation target region of an autofocus function to a ring-shaped portion centered around a center of a ring-shaped image.

* * * * *